United States Patent [19]

Murata et al.

[11] 3,872,254

[45] Mar. 18, 1975

[54] REMOTE CONTROL SYSTEM AND APPARATUS FOR AUTOMATIC TELEPHONE ANSWERING AND RECORDING APPARATUS

[75] Inventors: Masamichi Murata; Yuji Urayama, both of Yokohama; Takamasa Furusawa, Shimizu, all of Japan

[73] Assignee: Victor Company of Japan, Ltd., Yokohama, Kanagawa-ken, Japan

[22] Filed: June 4, 1973

[21] Appl. No.: 366,765

Related U.S. Application Data

[63] Continuation-in-part of Ser. No. 341,674, March 15, 1973, abandoned.

[30] Foreign Application Priority Data

| | | |
|---|---|---|
| Mar. 18, 1972 | Japan | 47-27586 |
| June 12, 1972 | Japan | 47-68204 |
| June 5, 1972 | Japan | 47-55790 |
| June 5, 1972 | Japan | 47-55791 |

[52] U.S. Cl. .......... 179/6 E

[51] Int. Cl. .......... H04m 1/64

[58] Field of Search .......... 179/6 E, 6 R, 2 DP

[56] References Cited

UNITED STATES PATENTS

| | | | |
|---|---|---|---|
| 3,337,690 | 8/1967 | Martin | 169/6 E |
| 3,569,630 | 3/1971 | Parks et al. | 179/6 E |
| 3,651,267 | 3/1972 | Wittenberger | 179/6 R |
| 3,673,332 | 6/1972 | Muller | 179/6 E |

*Primary Examiner*—Stanley M. Urynowicz, Jr.
*Attorney, Agent, or Firm*—Owen, Wickersham & Erickson

[57] ABSTRACT

A remote control system and apparatus for an automatic telephone answering and recording apparatus comprises: means operating to render the answering and recording apparatus into a remotely operable state only in the case where signals corresponding to numerals of any number of digits previously set on the apparatus side are applied thereto from a remote point, through a telephone line, in the specific sequence, and at intervals within a specific period; mode control means for placing the appartus in a state for an operational mode according to the signals of the digits when, after the operation of the first named means, the digit signals are applied singly; and means for changing the apparatus to the mode corresponding to a specific mode control signal from the mode control means and to a stop signal recording mode in accordance with whether the output duration time of the mode control signal is shorter or longer than a predetermined time period.

3 Claims, 11 Drawing Figures

REMOTE CONTROL SYSTEM AND APPARATUS FOR AUTOMATIC TELEPHONE ANSWERING AND RECORDING APPARATUS

This application is a continuation-in-part application of the copending application Ser. No. 341,674 filed on Mar. 15, 1973 now abandoned for Ser. No. 397,538 .

BACKGROUND OF THE INVENTION

This invention relates generally to a remote control system and apparatus for an automatic telephone answering and recording apparatus and, more particularly, the present invention relates to a system and apparatus for controlling, from a remote place by means of a telephone line, automatic telephone answering and recording operations of an apparatus automatically establishing a speaking circuit for an incoming call signal in the case where no one is at home, transmitting by means of a previously recorded recording tape a necessary message to the caller, and then recording the caller's message, these telephone answering and recording operations being thus controlled in a manner to undergo various operational modes.

An automatic telephone answering and recording apparatus of a type generally employed a present operates automatically to answer each incoming call, to notify the caller that no one is at home, and to record any message of the caller. In order to listen the contents of the message thus recorded, the person for whom the message is intended must, after returning home, manually operate the apparatus to play back or reproduce the recorded message. Accordingly, if it were possible for this called person to carry out the operation of hearing the recorded message by remote control from a place way from this home, it would be very convenient, and, therefore, various methods and means for accomplishing this have heretofore been proposed.

For example, in one proposed method a special whistle is sounded toward a telephone handset, or a portable oscillator is used to send a specific signal at the remote place, while at the automatic telephone answering and recording apparatus, the signal thus sent is received through the use of a lead selector or filter operating only with respect to a specific frequency thereby to accomplish automatically necessary control operation and thereby to send the recorded message subject matter to the called person. By this method, however, in the case where a larger number of apparatuses of the same kind are used, the kinds of signals which can be used are limited in number, whereby this method disadvantageously is deficient on the point of security and maintenance of secrets.

On one hand, a method wherein use is made of special combinations of signals for the purpose of maintenance of secrets has been proposed, but the control operations of this method are extremely troublesome, and the attendant problems thereof have been too numerous for wide reduction thereof to practice.

Furthermore, in either of the above described methods, an object such as a whistle or a portable oscillator has been necessary as a signal source for remote control. Another problem has been that, since the signals used have been of one kind or two kinds for a single apparatus, it has been difficult to carry out, not only the mere operation of hearing the recorded subject matter, but remote control procedures of various kinds such as changing or amending the subject matter of the called person's own announcement on the answering side and preventing the erasure of recorded contents of an important message from the caller.

In order to overcome the above described difficulites, the present invention makes use of a telephone set in a touch-tone system directly, as it is, as a controller and make use of pair tones corresponding respectively to the numerals from 0 to 9. Furthermore, in the case where a dial-type telephone set is used, remote control is accomplished by using the output of a portable signal generator generating the same pair tones as a touch-tone telephone set (also known as a push-phone in Japan).

SUMMARY OF THE INVENTION

Accordingly, it is a general object of this invention to provide a novel and useful remote control system and apparatus for an automatic telephone answering and recording apparatus wherein the diffiiculite encountered in systems and apparatuses in the prior art are overcome.

More specifically, an object of this invention is to provide a remote control system and apparatus operating to render the answering and recording apparatus remotely operable when control signals of three digits composed by combining selected pair tones from among pair tones generated when push buttons of numerals from 0 to 9 of a telephone set in a touch-tone system (hereinafter referred to as a touch-tone telephone) are pushed or control signals of three digits which are generated from a signal generator and are the same as those mentioned above are applied in a predetermined sequence and for a specific time in correspondence with signals to be detected by selective detection means previously set on the answering apparatus side and operating in response to the arrival thereafter of control signals of the first, second, and third digits to set the apparatus respectively in the operational modes of "record", "playback", and "rewind". By the use of this system and apparatus, it is possible to accomplish remote control and activation of a large number of operational modes, and, furthermore, ample security for preserving secrets is afforded.

Another object of this invention is to provide a remote control system and apparatus capable of changing the answering and recording apparatus to the recording mode upon receiving a control signal of the first digit for a time shorter than a predetermined time and changing the apparatus to mode for recording a stop signal upon receiving the first-digit control signal for a time longer than the predetermined time thereby to record the stop signal at any position on a magnetic tape on the side for recording incoming messages. By the use of this system and apparatus, it is possible at the time of rewinding to limit the rewinding of the tape on the message recording side at the stop signal recorded position, and erroneous erasure of the contents of the recorded message can be prevented.

Further objects and features of the invention will be apparent from the following detailed description when read in conjunction with the accompanying drawings.

DETAILED DESCRIPTION

A general description of the control procedures and operation of a remote control system according to the present invention will now be described with reference first to FIGS. 1A, 1B, 2, and 3.

Figure 1A:
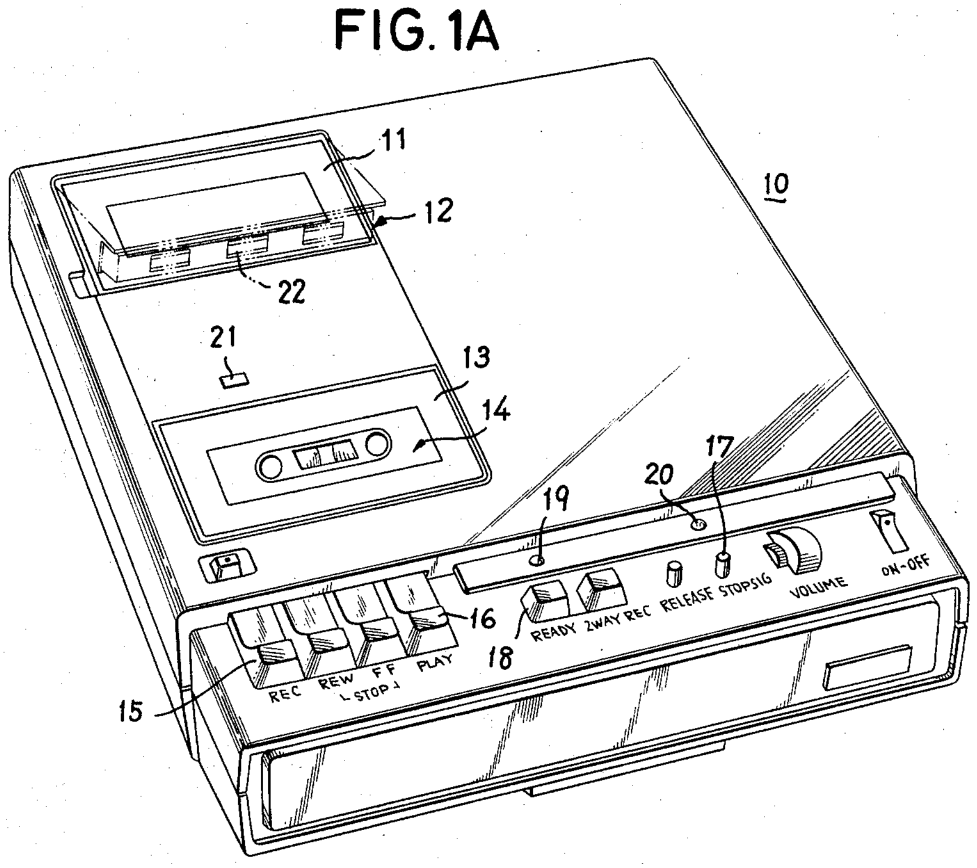
FIGS. 1A, 1B, and 1C are respectively a perspective view, a bottom view, and a diagrammatic plan view of one-embodiment of an automatic telephone answering and recording apparatus which is remotely controlled in the system of the present invention.

The automatic telephone answering and recording apparatus (hereinafter referred to simply as "apparatus") 10 as shown in FIG. 1A has an answering-side cassette holder 11, in which is loaded an endless-tape cassette 12 in which a message intended for callers or callling parties has been already recorded. The apparatus 10 also has a cassette holder 13 for the caller' s message recording side, in which holder 13 is loaded an ordinary unrecorded cassette 14. The apparatus is provided further with a control panel having a recording button 15, a reproducting or play-back button 16, a button 17 for recording stop signals, a standby or ready button 18, a ready lamp 19, and an operation lamp 20.

When the recording button 15 and the play-back button 16 are pushed, and, further the button 17 for stop signal recording is pushed, a stop signal is recorded at the head of the tape in the cassette 14 for recording the caller' s message. When, upon completion of recording of this stop signal, the ready button 18 is additionally pushed, the apparatus assumes a standby or ready state, and the ready lamp 19 is lit to indicate this state.

When there is an incoming signal from the caller the apparatus in this ready state, the apparatus assumes an automatic answering state, and the direct-current circuit of the telephone line is closed, whereupon the automatic sending out of a notice of absence of the called party over the telephone line is started. Simultaneously, the operation lamp 20 is lit to indicate that automatic answering is being carried out, and, at the same time an incoming signal lamp 21 is lit to indicate that there has been an incoming signal during the absence of the called party.

Upon completion of the sending out of the notice of absence by the answering side tape, a beep tone signaling the start of recording of any message from the caller is sent out. This beep tone is controlled and sent out by a sending tape 22 bonded to the endless tape within the cassette 12. Thus, the tape for recording incoming messages operates and tarts to record the caller's message. Then, upon completion of one operational cycle of answering and incoming message recording, the apparatus automatically stops and returns to iis original state thereby to assume its standby state of readiness for a next incoming call.

If during the automatic answering operation of the apparatus the power supply is cut off because of power failure or the like reason, all of the functions of the apparatus will stop. Then, when the power supply is restored, as in the case of a temporary power interruption, for example, the tape for answering is set at the head of its recorded message, and the apparatus automatically assumes its ready state without the direct-current circuit of the telephone line being closed.

The foregoing description relates to a function of a known automatic telephone answering and recording apparatus.

Next, the remote control procedure and function constituting a characteristic feature of the system of the present invention will now be described. At the instant when the recording of the tape of the cassette 14 for recording the caller's message has been completed up to the tape end and the succeeding recording has become impossible, or when the tape end is reached with the apparatus in the play-back or recording state because of erroneous operation during remote control described hereinafter, the cutting off from the telephone line is not effected, and the apparatus generates a signal indicating that the tape end has been reached thereby to stop the driving of the tape and assumes the standby or ready state upon completion of the communication. Then, in the case where there is a next incoming call, the apparatus is coupled to the telephone line, but the called party's message is not sent out. Therefore, by sending a control signal after hearing the beep tone, the owner of the apparatus (the caller in this case) can accomplish remote control.

In the case where the apparatus is to be remotely controlled to hear the content of a call which has come in during the owner's absence, the owner from his outside calling phone calls the telephone to which the apparatus is connected in his home or office and sets the apparatus in its automatic answering state. Then, when the apparatus becomes capable of recording an incoming message, that is, when the beep tone can be heard after completion of the sending out of the notice of absence of the owner, the owner sends to the apparatus a predetermined control signal such as a three-digit numerical control signal, for example.

Figure 2:
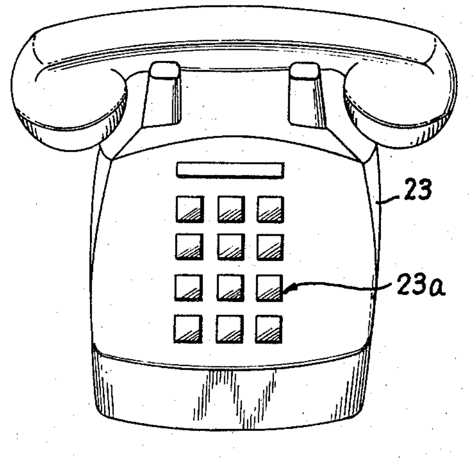
FIG. 2 is a perspective view showing the outer appearance of one example of a touch-tone telephone set which an be utilized in the system of the invention.
Figure 3:
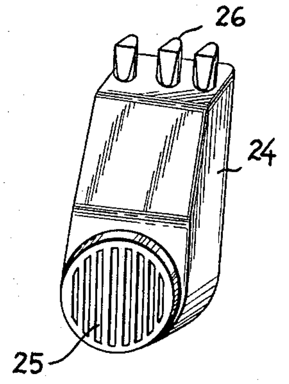
FIG. 3 is a perspective view showing the outer appearance of one example of a pair-tone generator used in the system of the invention.

In order to send this control signal, a touch-tone telephone set as shown in FIG. 2 or FIG. 3 or a portable oscillator is used. In the case where the touch-tone telephone set 23 shown in FIG. 2 is used, the above mentioned three-digit numeral iis selected from the digits 0 through 9 of the push buttons *23a*. By successively pushing the push buttons of the digits thus selected, pair tones corresponding to the digits of the buttons thus pushed are successively generated and used as the above mentioned three-digit control signal.

The portable oscillator 24 shown in FIG. 3 is used in the case where a touch-tone telephone set is not available at the place of remote control, and only a conventional dial type telephone set can be used. The portable oscillator 24 is provided with three buttons 26 for generating pair tones of respective digits. By pushing these buttons in a prescribed sequence, specific pair tones are emitted from the loudspeaker 25. In addition, this oscillator 24 has a selector (not shown) for selectively adjusting as desired the numerals of the digits and, furthermore, has a built-in battery (also not shown) for a power supply.

In this case, with respect to the length and interval with which the signals are sent, standard conditions are previously decided upon. For example, the length of the signal is selected to be 0.5 seconds or more, and at the same time the interval is selected within 5 seconds. In the case where a signal is sent in a form which does not satisfy the conditions thus established, the signal thus sent becomes invalid, and the apparatus cannot be controlled unless a control signal fulfilling these condition is sent anew. When a three-digit control signal is thus sent from a remote control point, through the telephone line, to the apparatus, it is compared in the apparatus with a preset three-digit numeral.

Figure 1B:
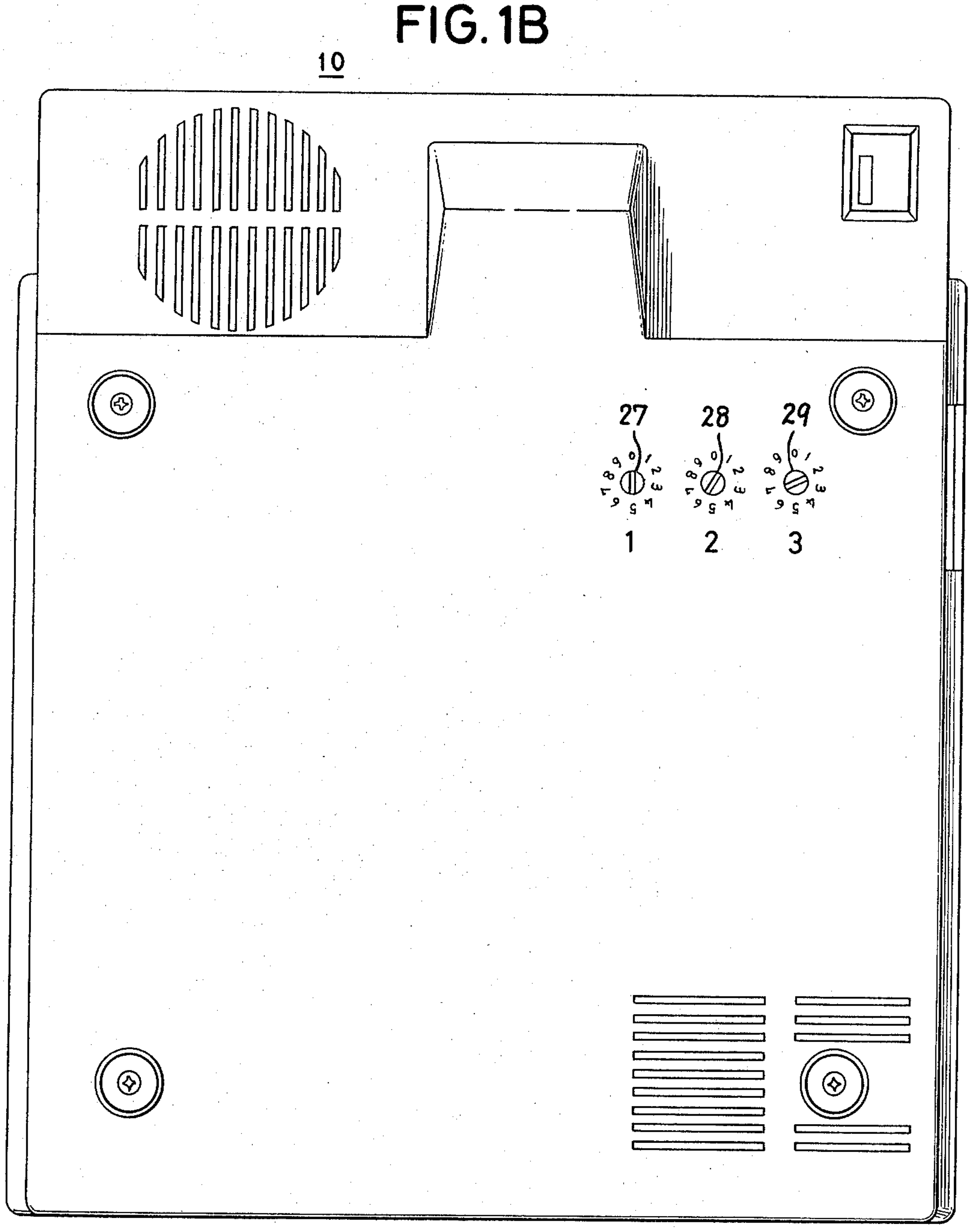

On the bottom surface of the apparatus 10, as shown in FIG. 1B, there are provided three selectors 27, 28, and 29 for selectively setting the above mentioned three-digit numeral. More specifically, the selector 27 is used for setting the numeral of the first digit, the selector 28 for setting the numeral of the second digit, and the selector 29 for setting the numeral of the third digit. This three-digit control signal is kept secret to prevent the device from being connected by a caller who is not authorized to use the apparatus, and the preset combination is thus selectively adjustable at will by the owner by means of the selectors 27, 28, and 29. In the apparatus, as mentioned above, the three-digit control signal is received and compared with the present three-digit numeral, and, when the two numerals coincide, the following control operation is carried out.

First, when, with the apparatus is in the state for recording a caller's message the control signal coinciding with the preset three-digit numeral is received, the apparatus assumes a rewinding state and rewinds the tape for recording callers' messages within the cassette 14 until a stop signal is detected. Once, this rewinding has been accomplished, controls of different functions corresponding respectively to the three-digit numerals mentioned above are carried out. More specifically: the numeral of the first digit is assigned the function of placing the apparatus in the recording state; the numeral of the second digit is assigned the function of placing the apparatus in the reproducing or playing back state; and the numeral of the third digit is assigned the function of placing the apparatus in the state of rewinding.

Accordingly, when the apparatus is in the recording state, the apparatus continues to be in its recording state when the signal of the numeral of the first digit is received, assumes the play-back state when the signal of the second-digit numeral is received, and assumes the rewinding state upon receiving and as long as it is receiving the signal of the third-digit numeral and automatically assumes the play-back state when the third-digit signal is no longer received.

When the apparatus is in the reproducing or play-back state, it assumes the recording state upon receiving the signal of the first-digit numeral, and when it receives the signal of the second-digit numeral, the mechanism of its answering side assumes the recording state, whereby another new recording of an answering statement becomes possible. Then, upon receiving the signal of the third-digit numeral, the apparatus assumes the rewinding state as long as this signal is being received and automatically assumes the play-back state when the signal is no longer received similarly as at the time of recording state.

When the telephone handset is placed on its cradle upon recording of the message of the caller, the apparatus continues to be in its silent state, and thereafter the apparatus is automatically stopped by a voice activity control (VAC) operation and assumes the standby or ready state to await the succeeding call.

In some cases when the recorded message has been heard at the remote calling place, there msy arise the necessity of preserving the message in its recorded state because of the importance of its content. In order to prevent an erroneous erasure of this record message, it is possible to record a stop signal at any position on the tape of the cassette 14 from the remote place of call so that the tape will not be rewound beyond a certain part when the next call is received. In such a case, when the apparatus is in either the play-back state or the recording state, the signal of the first digit is sent for a specific time, for example, two seconds or more, and the control signal is recorded, whereupon the apparatus automatically stops and assumes the ready state. This recorded signal becomes a stop signal, and when a call is made the next time to effect remote control of the apparatus, it carries out rewinding up to the part where this stop signal has been recorded and immediately thereafter changes to the play-back state. Therefore, there is no possibility of erasure of the content of incoming messages on the tape in front of the newly recorded stop signal.

In the case where the content of the recorded incoming message which has just been heard may be erased in entirety, the sending of the signal of the third-digit numeral is continued, and the tape is rewound up to the part thereof where winding beings and a stop signal is recorded. The apparatus thereupon changes from the rewinding state to the play-back state. Accordingly, after the stop signal recorded in the initial beginning part of the tape has been verified, the signal of the first-digit numeral is sent, and after the apparatus has been placed in the recording state from the play-back state, the handset is returned to its cradle. The apparatus thereupon assumes the ready state, and, when the succeeding call is received, the tape for recording incoming messages can be used again from its initial beginning part.

In the case where, when the content of a recorded incoming message is being listened to with the apparatus in play-back state, it is desired at an intermediate instant to hear again the message which has already been played once, the signal of the third-digit numeral is sent for a time period corresponding to the amount of rewinding, whereupon it is possible to rewind through any desired amount. After rewinding, the apparatus immediately assumes the play-back state, and replaying back of the message content can be readily carried out.

When, with the apparatus in the play-back state and the content of the recorded message being listened to, it is desired to add a comment regarding the content of this message, the signal of the first-digit numeral is sent, and after the apparatus is placed in the recording state, the necessary comment is sent and thereby recorded. Thereafter, the signal of the second-digit numeral is sent, and the apparatus is placed in the play-back state, whereupon it becomes possible again to continue listening to the recorded message.

A still further feature of the invention is that, in the event that for some reason such as a change in the owner's schedule, the content of the notice of the ower's absence to be sent out can be revised in the following manner. When with the apparatus in the play-back state, a signal of the second-digit numeral is sent, the circuit of the side of the apparatus for recording incoming message stops operating, and the circuit on the answering side operates. Then, when a signal for starting the recording of a notice of the owner's absence is sent, and the circuit operation of the apparatus is changed over from the incoming message recording side to the answering side, the answering side assumes the recording state and starts recording of a new notice of the owner's absence.

When the tape of the cassette 12 completes one circuit of travel, an autocheck of the recording is next carried out, and the new content of the notice of the owner's absence which has been just recorded is verified. The changing over of those modes of operation is carried out by a sensing operation. Upon completion of the check, the circuit of the apparatus is automatically changed over to the side of recording incoming messages and assumes the play-back state. Accordingly, in the case where one more revision is necessary after the check, the above described procedure is repeated.

As described above, by sending control signals of specific digits which he has himself predetermined, the owner of the apparatus can, from a remote place, carry out by remote control various control operations such as listening to recorded messages from callers during his absence, changing the notices recorded by him to be transmitted to callers, erasing or recording recorded incoming messages, and preventing the erasure of important recorded incoming messages.

The specific organization of one embodiment of the apparatus of the invention having the function of answering calls in the owner's absence and the remote control function as described above will now to be described with referencne to FIGS. 4A, 4B and 5A, 5B showing circuit diagrams of the embodiment of the apparatus according to the invention.

When the power-supply switch S1 connected to the primary winding side of a power-supply transformer T1 is switched on, that is, closed, a power lamp PL1 connected to the secondary winding side of the transformer T1 is lit. The resulting AC voltage is converted by a power-supply circuit X15 into a DC voltage, for example of 12V, which is supplied through a line 30 to various circuits of the apparatus.

Figure 1C:
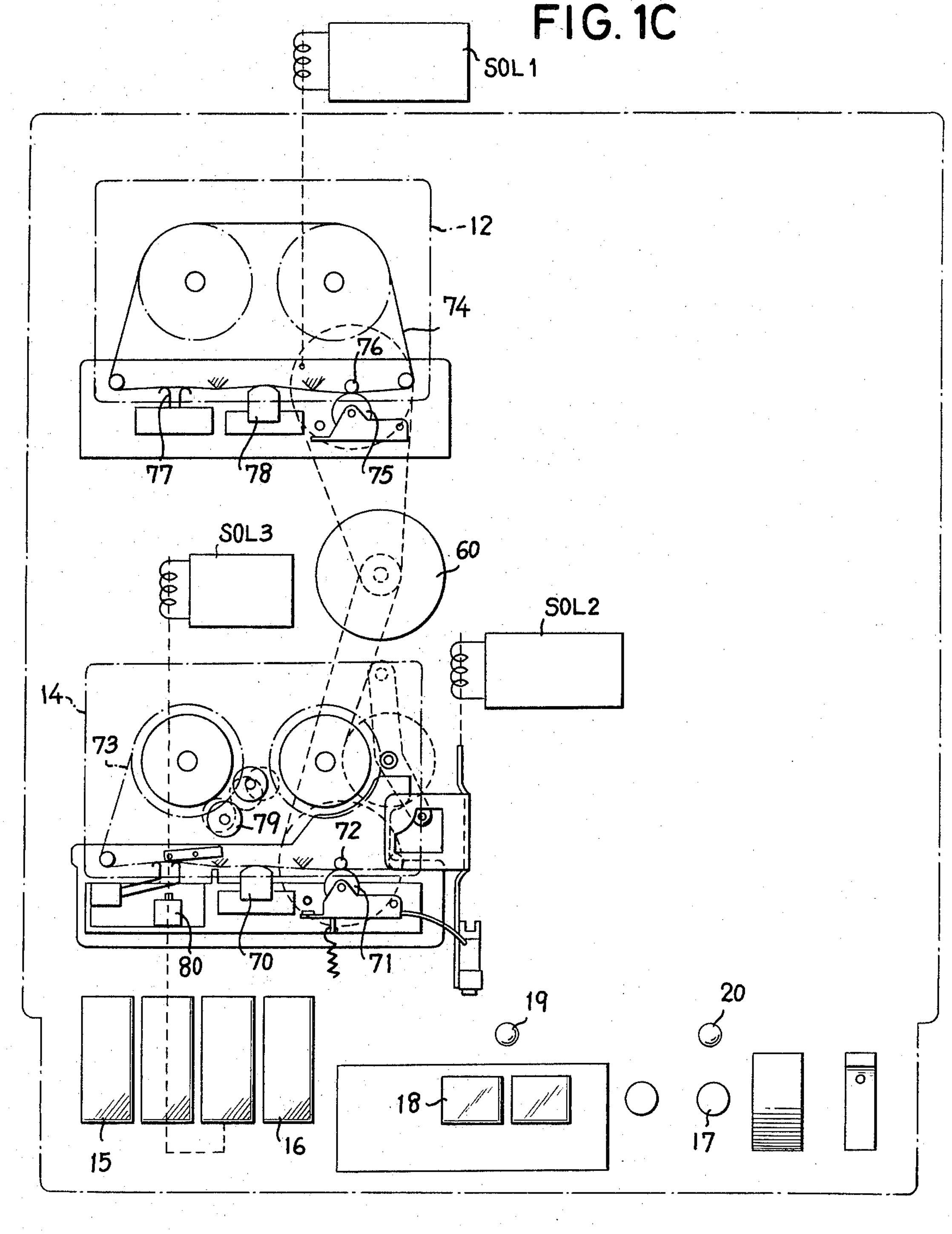

A cassette 12 containing an endless tape on which a notice to be sent to a caller has already been recorded is loaded into the cassette holder 11 on the answering side of the apparatus, and a cassette 14 for recording incoming messages from callers is loaded into the cassette holder 13 on the caller's message recording side. Then, when the recording button 15 and the play-back button 16 are pushed, recording changeover switches S2-1 through S2-9 and play-back switches S4-1 and S4-2, being mechanically coupled to these buttons 15 and 16, are respectively changed over from their states indicated in FIG. 4 and are thus locked. When the button 17 for stop signal recording is successively pushed, switches S7-1 and S7-2 operate in intercoupled relation thereto, whereby a stop signal recording and holding ciruit X16 operates for a certain specific time. As a consequence, a stop signal generating circuit X14 operates for a specific time, and an oscillation output is supplied therefrom, through relay contact points Sf2, and Se1, to an incoming message recording head H3. In FIG. 1C, a head assembly 70 comprises a recording head H3 and erasing H4.

On one hand, the output of the above mentioned circuit X16 for stop singal recording and holding is applied through a line 31 to an incoming message recording side control relay 52, which thereupon operates to close relay contact points Sc1 and Sc2. Consequently, the output of the DC current supply circuit X15 is applied through switches S3-1 and S4-1 and the relay contact point Sc2 to a sensor operating circuit X5 to activate the same, and the resulting output therefrom is applied by way of a resistor R3 and a diode D8 to the base of a transistor Tr1, which thereupon assumes a conductive state.

Furthermore, the output DC current from the circuit X15 is applied through the closed switch S4-1 and relay contact Sc2 to a plunger solenoid SOL2 on the message recording side, one side of which is grounded through the transistor Tr1. The plunger solenoid SOL2 thereupon operates, whereby a pinch roller 71 of the tape recorder on the incoming message recording side is pressed against a capstan 72. Furthermore, the DC current flowing through the switch S4-1 is supplied through a diode D4 to a DC motor 60 for driving simultaneously capstans installed in a tape recorder on the incoming message recording side and a tape recorder on the answering side thereby to cause this motor to operate.

In addition, the output current from the circuit X15 is applied by way of the switches S3-1 and S4-1, relay contact point Sc2, and switch S2-7 to an amplifier switch circuit X8, the resulting output of which is applied to a bias oscillator X13 and, at the same time, is supplied by way of an amplifier switch circuit X11 to a recording amplifier X12. Consequently, the tape 73 for recording incoming messages of the cassette 14 is clamped between and driven by the corresponding pinch roller 71 and capstan 72, and, at the same time, the output signal from the stop signal generating circuit X14 is recorded as a stop signal by the incoming message recording head H3. This stop signal recording operation is held only during the operation time (approximately 10 seconds) of the aforementioned stop signal recording and holding circuit X16.

Figure 4A:
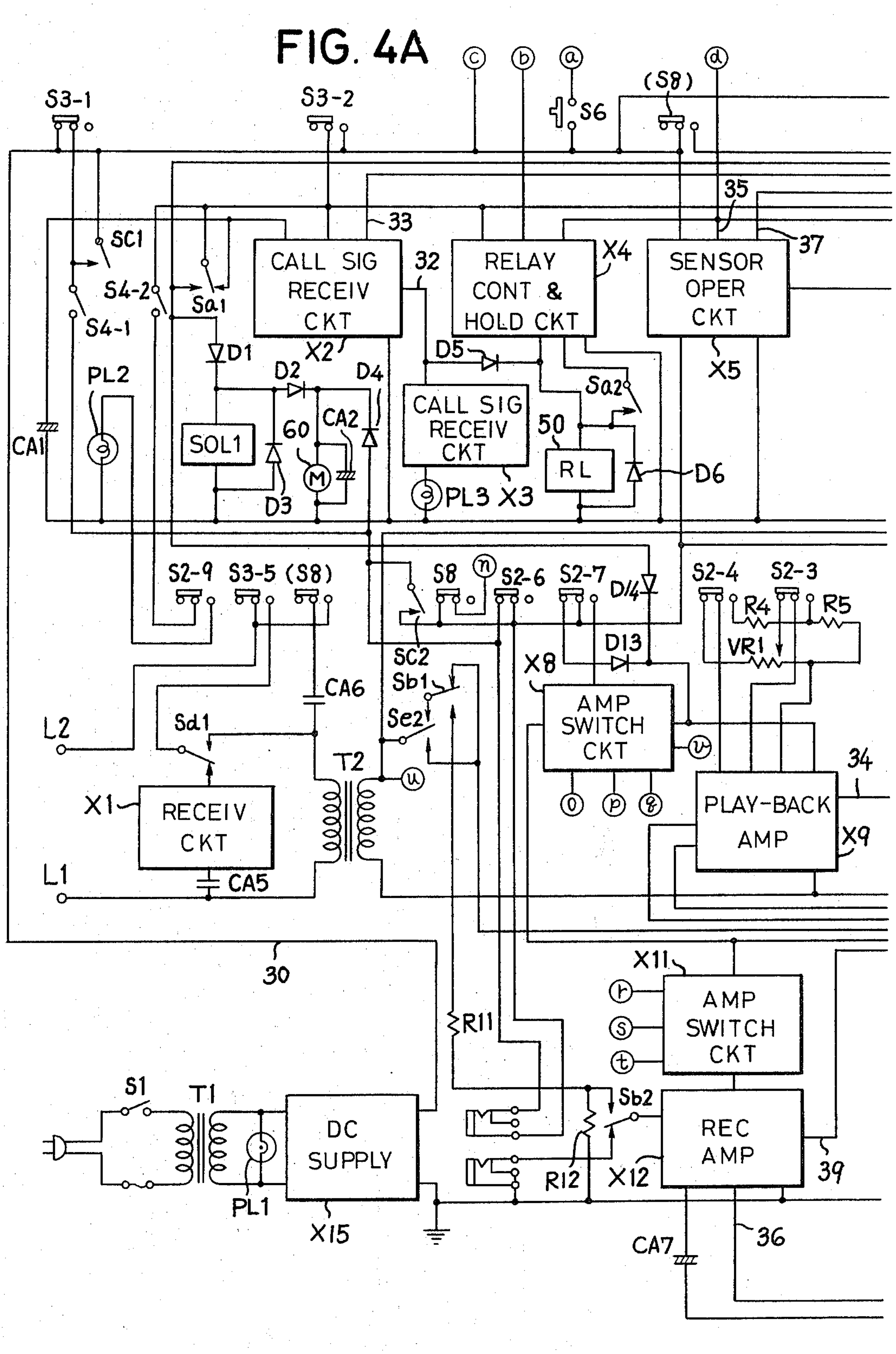
FIGS. 4A, 4B and 5A, 5B are circuit diagrams showing various essential parts of one embodiment of a control circuit in an automatic telephone answering and recording apparatus remotely controlled in the system of the invention.

After completion of the recording of the stop signal, the standby or ready button 18 is pressed, whereupon absence recording selection switches S3-1 through S3-5 are changed over from their respective states indicated in FIG. 4A, and DC voltage is supplied through the switch S3-2 and a line 41 to a relay controlling and holding circuit X4, which thereupon operates. Consequently, an answering relay 50 operates, whereby its relay contact points Sa1 and Sa2 are changed over, and as a result of the changing over of the relay contact point Sa2 for self-holding, the relay 50 is self held. Consequently, a DC voltage is supplied by way of the switch S3-2, relay contact point Sa1, and a diode D1 to a plunger solenoid SOL1 on the answering side and is further supplied by way of a diode D2 to the DC motor 60. As a consequence, an endless taper 74 within the answering side cassette 12 is clamped between and driven by a pinch roller 75 and a capstan 76.

When, during the travel of this endless tape 74, the sensing tape 22 reaches a sensor 77, the sensor operating circuit X5 operates, and a pulse signal is supplied by way of a line 35 to the relay control holding circuit X4. As a consequence, the relay contact point Sa2 for self holding is opened, whereby the relay 50 is placed in its inoperative state, and the plunger solenoid SOL1 and the DC motor 60 are rendered inoperative. Accordingly, the above mentioned endless tape for answering automatically stops, whereby resetting of the tape to its starting point is accomplished.

On one hand, the power-supply voltage is supplied by way of the switches S3-2, S4-2, and S2-9 to a ready lamp PL2 (lamp 19 in FIG. 1A), whereby this lamp is lit to indicate that the apparatus has assumed the ready state.

Next, the operation in the case where, with the apparatus in the above described ready state, a call is received will be described. When a call signal arrives at terminals L1 and L2 for connection to the telephone line, it flows along a closed circuit comprising the terminal L2, the switch S3-5, a relay contact point Sd1 of a relay 53, a receiving circuit X1 for receiving call signals, a capacitor GA5, and the terminal L1, whereupon the receiving circuit Xl operates. In intercoupled relation with this operation of the circuit Xl, a call signal receiving circuit X2 operates and produces an output, which is supplied through a line 32 to a call signal receiving circuit X3 and the relay 50. Consequently, a call reception lamp PL3 (lamp 21 in FIG. 1A) is lit, and the relay operates.

The relay 50 is self held in operative state by the closure of the relay point Sa2 for self holding and the operation of the relay control holding circuit X4. Futhermore, as a consequence of the operation of the relay 50, a DC voltage is applied by way of the switch S3-2, and relay contact point Sal to the plunger solenoid SOL1 for driving the apparatus on the answering side and to the motor 60 and is applied further through a diode D14 to a play-back amplifier X9 thereby to activate these components.

As a consequence, the endless tape 74 for answering, in reset state wherein its head or starting point is positioned for operation, is clamped between and driven by its pinch roller 75 and capstan 76, and playing back of a message for answering recorded on the tape of the cassette 12 by a recording and play back head H1 of the head assembly 78 for answering and the play-back amplifier X9 is carried out. The output of the play-back amplifier X9 pass through a line 34, the switch S2-5, and an attenuator comprising resistors R6, R7, and R8, through relay contact points Sb1 and Se2 of relays 51 and 54 and further through a coupling transformer T2, passes further through the relay contact point Sd1 connected in changed over state of the relay 53, the switch S3-5, and the terminal L2, and is sent into the telephone line as an answering message for transmitting a notice of the owner's absence.

The output of the call signal receiving circuit X2 passes through a line 33 and is supplied to the relays 52 and 53 and a control holding circuit X7 for control holding of an operation lamp PL4. Consequently, the relay 53 operates, whereby the relay contact point Sd1 is changed over, and the operation lamp PL4 (lamp 20 in FIG. 1A) is lit thereby to indicate that the apparatus is operating.

When the message of notification of the owner' s absence is sent, and the endless tape 74 for answering of the cassette 12 completes one revolution of travel, whereby the sensing tape 22 arrives at the position of the sensor 77, the sensor operation circuit X5 operates, and different output signals appear in lines 37 and 35. The output signal appearing in the line 37 from the circuit X5 is supplied to a beep-tone generating circuit X6, which thereupon operates. The resulting output of this circuit X6 passes through a line 38 and is sent as a beep tone by way of the transformer T2, relay contact point Sd1, switch S3-5, and terminal L2 to the calling party or the caller.

The output signal appearing in the line 35 from the sensor operation circuit X5 is supplied to the relay controlling and holding circuit X4. Consequently, the relay 50 is released from its self held state, and, as described above, the plunger solenoid SOL1 driving the apparatus on the answering side is changed into an inoperative state, whereby the travel of the endless tape 74 for answering is again stopped in the rest head position.

On one hand, the output signal of the circuit X5 appearing in the line 35 is supplied to the controlling and holding circuit X7, and the resuling output from this circuit functions to hold the relays 51 and 52 in operative state. Consequently, the relay contact points Sb1, Sb2, Sc1, and Sc2 are changed over, and the motor 60 and the plunger solenoid P2 operate, whereby the operation of the apparatus is changed over to the incoming message recording state as described before. Therefore, by hearing the beep tone, the caller can verify the fact that the apparatus has been set for recording of incoming messages.

A voice signal for transmitting a message from the caller is sent through the telephone line and, entering the apparatus through the terminal L2, passes through the switch S3-5, contact point Sd1, transformer T2, relay contact point Se2, relay contact point Sb1 in changed over state, an attenuator comprising resistors R11 and R12, and relay contact point Sb2 in changed over state to be supplied to the recording amplifier X12. The resulting output from this amplifier X12 is supplied by way of a line 36, the relay contact point Sf2 of relay 55, and the relay contact point Se1 54 to the recording head H3 of the head assembly 70 on the incoming message recording side. Furthermore, a bias current from the bias generating circuit X13 in operative state is simultaneously being supplied to the recording head H3, by which the caller' s message is recorded on the unrecorded cassette tape 73 of the incoming message recording cassette 14.

At this time, monitor switches S5-1 and S5-2 are changed over, whereupon an output signal appearing in a line 39 from the recording amplifier X12 is supplied by way of monitor switches S5-1 and/or S5-2 and the switches S3-3 and S2-8 to an earphone jack 81 and further to a loudspeaker 26. Accordingly, it is also possible to monitor by means of the loudspeaker 26 the presently recorded message from the caller. Furthermore, the output of the recording amplifier X12 is conducted by way of the aformentioned line 39 to enter a voice activity control circuit (VAC) X10, which produces a DC output in accordance with the presence or absence of an input signal. The resulting output of this VAC X10 is supplied through a diode D15 to the controlling and holding circuit X7, which is thereby held in operative state, and the apparatus is held in the state for recording incoming messages.

Upon completion of the speaking of a message by the caller, and he places the handest on its cradle, the input signal from the recording amplifier X12 to the VAC X10 stops, and the output of this circuit X10 passing through the diode 15 expires after approximately 10 seconds. As a consequence, the controlling and holding circuit X7 is rendered inoperative, and the relays 51, 52, and 53 also become inoperative. Accordingly, the apparatus is uncoupled from the telephone line, and the motor 60 and the plunger solenoid SOL2 for driving the apparatus on the side for incoming messages are rendered inoperative and returned to their original ready states.

At this time, the ready lamp 19 (lamp PL2 in FIG. 4A) continues to be lit, but the operation lamp 20 (lamp PL4 in FIG. 4B) is extinguished. Furthermore, the call signal lamp 21 (lamp PL3) continues to be lit to indicate that an incoming call signal was received during the owner's absence. This call signal lamp 21 (PL3) is extinguished by once releasing the apparatus from its ready state or by operating a cut-off switch.

In the case where, during the above described automatic answering operation, the supply of power stops because of some reason such as temporary power failure and is then restored, the apparatus operates as follows. When the supply of power stops while, with the apparatus connected to the telephone line side, the operation of notifying a caller of the owner' s absence or recording of a caller's message is being carried out, all of the driving mechanisms and circuits are rendered inoperative.

Then, when the power supply for the apparatus is restored, an output voltage from the DC power supply circuit X15 is supplied by way of the switch S3-2 and the line 41 to the relay controlling and holding circuit X4, which thereupon operates. Accordingly, the relay 50 is held in operative state, and the motor 60 and the plunger solenoid SOL1 on the answering side operate similarly as described hereinbefore, whereby the endless tape 74 for the answering side is clamped and driven. Similarly as described above, when the sensing tape 22 bonded onto the endless tape 74 arrives at the position of the sensor 77, and the sensor operation circuit X5 operates, the apparatus on the answering side is rendered inoperative, and the endless tape for answering is stopped in the state wherein its head is reset for start of operation. In this case, however, since the relay 53 is in inoperative state, and the apparatus is cut off from the telephone line, the transmission of the notification of the owner's absence to a caller is not carried out.

The apparatus consituting the essential part of the system and apparatus of the invention is controllably manipluated and operated by its owner in the following manner in operating it by remote control.

The aforementioned three-digit numerals of the apparatus 10 are selected and set beforehand by adjustably setting the selectors 27, 28, and 29 on the bottom face of the apparatus, as shown in FIG. 1B. When the owner sends a call from a remote place to the telephone place to the telephone set at his home or office to which the apparatus 10 is connected, the answering notice and beep tone recorded on the endless tape 74 for answering is transmitted to the caller in the same manner as in the operation resulting from a call made by an ordinary caller. Thus, the endless tape 74 travels through one cycle and is stopped at the position where the sensing foil 22 reaches the sensor position. At this time, the apparatus assumes the state for recording incoming messages, the relays 51 and 52 being in operative state, and the output voltage of the DC power supply circuit X15 is applied by way of the relay contact point Sc1, switch S4-1, relay contact point Sc2, and switch S8 to a line *n*. Then the person desiring to carry out remote control operates the control signal transmitting means described hereinbefore with reference to FIGS. 2 and 3 thereby to cause remote control signals correpsonding to predetermined numerals of the three digits to be emitted in the prescribed sequence, sending these signals through the telephone set microphone and telephone line to the apparatus. Upon receiving these signals, the apparatus starts the rewinding of the tape for recording incoming messages by the following operation.

Figure 5A:
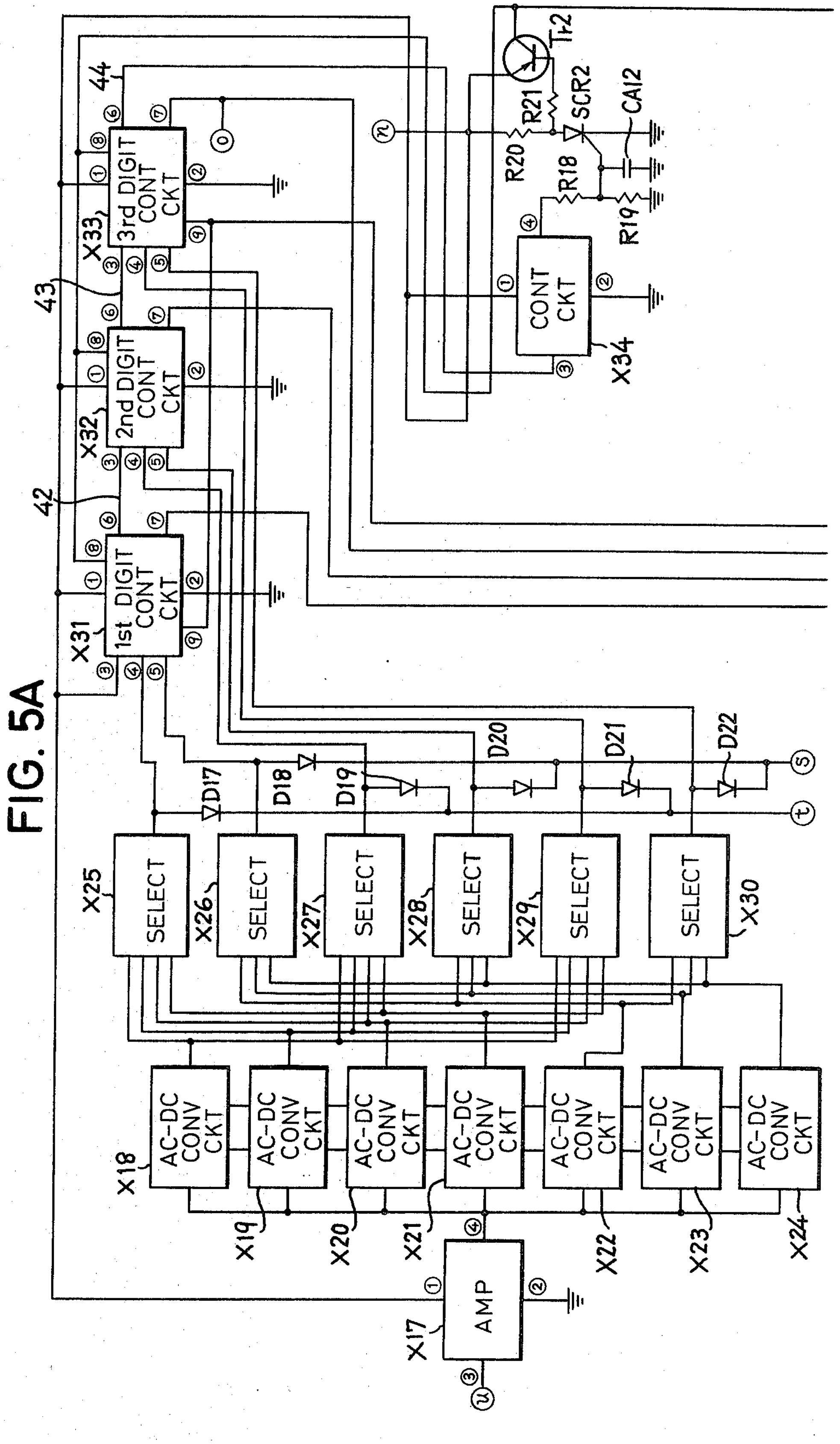

Each pair tone composed of a pair of signals of a high tone and a low tone and constituting a control signal is supplied from the telephone line by way of the coupling transfomer T2 and a line n to an amplifier X17 with limiter shown in FIG. 5A and is here amplified. The signal thus amplified further passes through a circuit group consisting of circuits X18 through X24 for respectively selecting high tones and low tones, and the numerals from 0 to 9 are distinguished according to the combinations of the high tones and low tones which have passed through this curcuit group.

Each of these AC-DC conversion circuits X18 through X24 comprises, a principally, a band-pass filter passing only a specific frequency, an amplifier for amplifying the output of this filter, a rectifier for rectifying the resulting amplified output, and, further, a DC amplifier for amplifying the signal thus rectified. The pass frequencies of the band-pass filters in these AC-DC conversion circuits are predetermined as follows: 697 Hz in X18; 770 Hz in X19; 852 Hz in X20; 941 Hz in X21; 1,209 Hz in X22; 1,331 Hz X23; and 1,477 Hz in X24. The outputs of these AC-DC conversion circuits X18 through X24 are suitably combined in three or four groups and applied to selector X25 through X30.

The selector X25 is the selector of the low tone of the first digit, while the selector X26 is the selector of the high tone of the first digit. Similarly, the selectors X27 and X28 are respectively the selectors of the low tone and the high tone of the second digit, while selectors X29 and X30 are respectively the selectors of the low tone and the high tone of the third digit. The outputs of the selectors X25 and X26 of the first digit are applied to a control circuit X31 of the first digit. Similarly, the outputs of the selectors X27 and X28 of the second digit are applied to a control circuit X32 of the second digit, and the outputs of the selectors X29 and X30 of the third digit are applied to a control circuit X33 of the third digit.

The distinguishing or reading of the above mentioned numerals is accomplished in the following manner. When, in a circuit wherein the selectors X25 through X30, such as rotary switches, and the circuits X18 through X24 are connected, a signal of the first digit which has passed through a filter of a combination corresponding to a certain specified numeral coincides with the selector contact connection, it activates the control circuit 31, which thereupon sends a signal through the output line 42 thereof to control the control circuit X32. This signal is held for approximately 5 seconds. Accordingly, if there is no arrival of a succeeding signal within this 5 second period, the preceding signal up to this instant will be nullified. On the other hand, if the signal of the first digit does not coincide with the selector contact connection, the control circuit X31 will not operate, whereby it will not be possible to control the apparatus from the remote point.

Next, in the case where the signal of the second digit passing through the filter group X18 through X24 coincides with the selector connection, the control circuit X32 receives an input at its input terminals ④ and ⑤ and operates to produce an output, which enters the control circuit X33 through a line 43. This signal is also held for 5 seconds. In the case where the signal of the second-digit numeral coincides with the numeral preset in the apparatus, also, if the signal of the third digit which next arrives through the filter group X18 through X24, upon being received, conicides with the selector connection, it will be applied to the input terminals ④ and ⑤ of the control circuit X33.

Thus, the control circuit X33 operates and produces an output, which passes through a line 44 to enter a control circuit X34. This control circuit X34 is capable, after an input applied thereto has been cut off, of supplying an output for a specific time to another circuit. After an output signal from the circuit X33 for the control circuit X34 stops, the output produced from the circuit X34 is applied to the gate of a silicon control rectifying element SCR2, which thereupon becomes conductive. Consequently, a regular-direction bias is applied to the base of a transistor Tr2, which thereby is turned ON.

When this transistor Tr2 is turned on, a voltage is supplied to the entire remote-control circuit as a standby signal thereby making the entire remote-control circuit in a standby mode. Furthermore, a voltage is applied to the input terminal ⑧ of the control circuits X31, X32, and X33, and the operation of the circuit varies. More specifically, when inputs are applied to all of the input terminals ③④⑤ of the control circuits X31, X32, and X33 prior to the remote-control operation, an output is produced at the output terminal ⑥ and held for 5 seconds, but subsequent to the remote-control operation, outputs are produced at the output terminals ⑥ and ⑦ over the period during which an input signal is being applied to the input terminals ④ and ⑤.

Accordingly, during remote control, when the signal of the numeral of one of the digits among the numerals of the three digits arrives, outputs are produced at the output terminals ⑥ and ⑦ of the circuit corresponding to the numeral of the digit of the input signal in the control circuits X31, X32, and X33. In the control manipulation described below, only a signal from the output terminal ⑦ is used.

Figure 6:
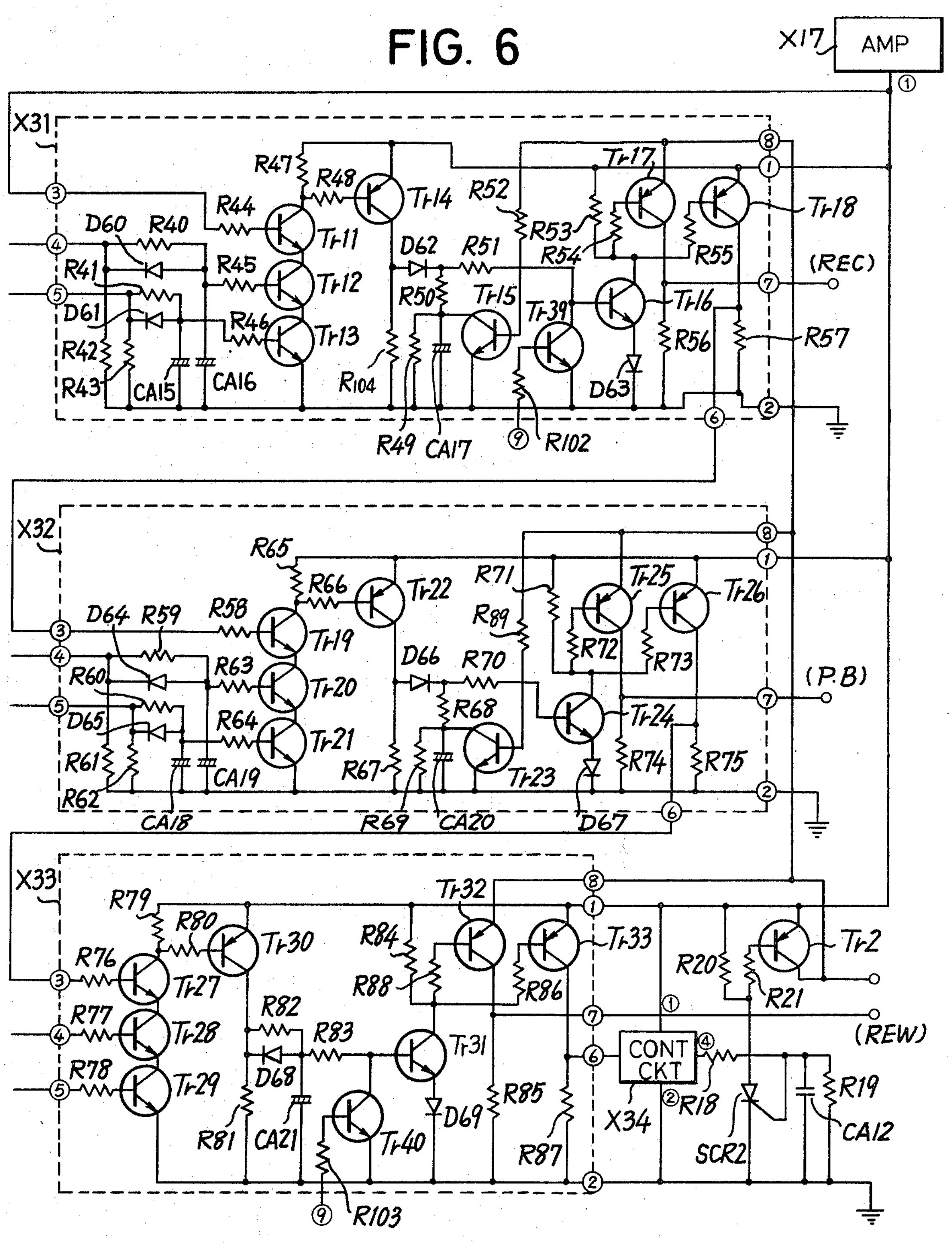
FIG. 6 is a circuit diagram of one embodiment of a specific electrical circuit of the control circuit for the first, second or third digit shown in FIG. 5A.

An embodiment of the aforementioned control circuits X31, X32, X33 of the first digit to the third digit will now be described with reference to FIG. 6, in which parts which are the same as those in FIG. 5A are designated by like reference numerals or characters. Detailed description of such parts already described will not be repeated.

The first digit control signal from the selector is applied to the input terminals ④ and ⑤ of the control circuit X31. The signal supplied to the input terminal ④ charges a capacitor CA16 by way of a resistor R40, and the signal supplied to the input terminal ⑤ charges a capacitor CA15 through a resistor R41. The terminal voltages between the terminals of the capacitors CA16 and CA15 are respectively applied through resistors R45 and R46 to and impressed across the base and emitter of each of the transistors Tr12 and Tr13, which are thereby rendered conductive when the control signal is applied to the input terminals ④ and ⑤ for a specific period. In the case where the applying period or duration of the control signal is shorter than a predetermined period (e.g., 500 msec.), the terminal voltages of the capacitors CA16 and CA15 will not reach the level to make the transistors Tr12 and Tr13 conductive, and the charges of the capacitors CA16 and CA15 are discharged respectively through a series circuit of a diode D60 and a resistor R42 and through another series circuit of a diode D61 and a resistor R43.

On one hand, to the input terminal ③, the positive voltage from the output terminal ① of the amplifier X17 shown in FIG. 5A is being continually supplied and is being applied to the base of a transistor Tr11, which is thereby rendered continually conductive.

Accordingly, when both the transistors Tr12 and Tr13 become conductive, the output current of the amplifier X17 which is applied to a terminal ① flows by way of a resistor 47 and the transistor Tr11, Tr12, and Tr13, whereupon the terminal voltage of a resistor R49 is applied to the base of a transistor Tr14. As a result, the transistor Tr14 is forward biased to become conductive, and the output current of the collector thereof charges a capacitor CA17 by way of a diode D62 and a resistor R50 and biases a transistor Tr16 forward by way of the diode D62 and a resistor R51, whereby the transistor Tr16 becomes conductive.

When the transistor Tr16 thus becomes conductive, a transistor Tr18 is biased by way of a resistor R55, the transistor Tr16 and a diode D63 to assume the conductive state. At this time, a transistor Tr17 is also biased by way of a resistor R54, the transistor Tr16, and the diode D63, but since a potential is not being applied to the emitter thereof, the transistor Tr17 is held in the nonconductive state. When the transistor Tr18 thus becomes conductive, the terminal voltage of a resistor R57 connected to the collector side thereof is derived from the output terminal ⑥ and then applied to the input terminal ③ of the succeeding control circuit X32.

When the control signal which has been supplied to the input terminals ④ and ⑤ of the control circuit X31 terminates, the transistors Tr12 and Tr13 are immediately rendered nonconductive, whereby the transistor Tr14 similarly becomes nonconductive. Simultaneously, the capacitor CA17 starts discharging, whereby the transistor Tr16 is still further held conductive for a specific period (e.g., of the order of 5 seconds). Accordingly, even after the control signal to the control circuit X31 has been removed the output appears at the output terminal ⑥ for the aforementioned period and is supplied to the terminal ③ of the control circuit X32 of the succeeding stage.

The control circuit X32 comprises transistors Tr19 through Tr26, resistors R58 through R75, diodes D64 through D67, and capacitors CA18 through CA20 and the organization thereof is the same as that of the above control circuit X31. Accordingly, when, during the period the output signal of the control circuit X31 is being applied to the input terminal ③ of the control circuit 32, the control signal of the second digit arrives at the input terminals ④ and ⑤, the control circuit X32 operates similarly as the above described control circuit X31 to produce an output signal through the output terminal ⑥ for a specific period. The output signal from this terminal ⑥ is supplied to the input terminal three of the succeeding control circuit X33.

Accordingly, when there is an arrival of the control signal of the third digit at the input terminals ④ and ⑤ of the circuit X33, while the signal applied to the input terminal ③ of the control circuit X33 is biasing a transistor Tr27 forwardly, these control signals are respectively applied through resistors R77 and R78 to the bases of transistors Tr28 and Tr29, whereby the transistors Tr27, Tr28, and Tr29 are simultaneously rendered conductive. As a result, the output current from the amplifier X17 is grounded by way of a resistor R79 and the transistors Tr27, Tr28, and Tr29, and the terminal voltage of the resistor R79 is applied through a resistor R80 to the base of a transistor Tr30, which is thereby rendered conductive. Therefore, the output current of the amplifier X17 is supplied by way of the transistor Tr30 and a resistor 82 to a capacitor CA21, which is thereby charged.

In the case where the control signal is supplied to the terminals ④ and ⑤ for a predetermined period (e.g., 0.5 second period) continuously, the terminal voltage of the capacitor CA21 reaches a specific level whereby a transistor Tr31 become conductive. When the period of application of the control signal is shorter than the predetermined period, the charge in the capacitor CA21 is promptly discharged through a diode D68 and a resistor R81, and the transistor Tr31 is thereby held in nonconductive state. When the transistor Tr31 becomes conductive, the output current of the amplifier X17 is sent to ground by way of the terminal ①, a resistor R84, the transistor Tr31, and a diode D69, whereby a transistor Tr33 is forward-biased by the terminal voltage of the resistor R84 to assume the conductive state.

Accordingly, the current being supplied to the terminal ① from the circuit X17 is led to ground by way of the transistor Tr33 and a resistor R87, and the terminal voltage of the resistor R87 thereby appears at the terminal ⑥ as the output voltage, which is supplied to the aforementioned control circuit X34.

The control circuit X34 operates for a specific period, as described before, after the input signal thereto is terminated and produces the signal from the output terminal ④ . More specifically, only when the control signals of three digits are sent in correct order, after the sending of the control signal of the third digit, the signal is produced from the output terminal of the control circuit X34, and applied through the resistor R18 to the gate of the silicon control rectifier SCR2, which is thereby rendered conductive. Moreover, the transistor Tr2 is forward biased to assume its conductive state, and the collector output thereof supplies the electric power to the entire remote operation control network as the standby signal.

Furthermore, the collector output voltage of the transistor Tr2 is applied to each input terminal ⑧ of the control circuits X31, X32, and X33. In the circuit X31 of the first digit, when above mentioned output voltage is applied to the input terminal ⑧ thereof, a transistor Tr15 is forwardly biased through a resistor R52 to become conductive. Therefore, the capacitor CA12 is short-circuited between its terminals and thereby loses its charging function. Furthermore, since the above mentioned voltage to the input terminal ⑧ is also applied to the emitter of the transistor Tr17, the control circuit X31 assumes the state in which when the control signal of the first digit is applied to the input terminals ④ and ⑤, the transistors Tr12, Tr13, Tr14, Tr16, Tr17, and Tr18 are all rendered conductive during the application of the above mentioned signal. Accordingly, the output appears at the output terminals ⑥ and ⑦ during the applying-time of the aforementioned control signal, and particularly the signal from the terminal ⑦ is supplied to a control circuit X35 and delay circuit X36, described hereinafter, as a signal for placing the apparatus in the recording mode.

In the control circuit X32 of the second digit, when the voltage is applied to the terminal ⑧ thereof, the transistor Tr23 is rendered conductive in the same manner as the aforementioned control circuit X31, whereby the terminals of a capacitor CA20 are short-circuited, and the aforementioned voltage is applied to the emitter of the transistor Tr25. Accordingly, the control circuit X32 generates output at the output terminals ⑥ and ⑦ throughout the period of application of the control signal of the second digit to the input terminals ④ and ⑤ thereof. Particularly, the signal from the terminal ⑦ is supplied to a control circuit X37, described hereinafter, as a signal for placing the apparatus in the reproducing mode.

Moreover, in the control circuit X33, when the voltage is applied to the terminal ⑧ thereof an output signal is produced at the terminal ⑦ during the period when the control signal of the third digit is applied to the input terminals ④ and ⑤ thereof in the same manner as in the aforementioned control circuit X31 and X32.

When the transistor Tr2 becomes conductive as described above, a circuit X40 for holding the rewinding state is held in a state wherein it is controlled by the charging current of a capacitor CA13, and an output signal is sent out from the output terminal ④. This signal from the output terminal ④ is applied by way of diodes D42 and D45 and a resistor R28 to the base of a transistor Tr6, which is thereby rendered conductive. Consequently, a short circuit is established between a line *f* and ground, and the bias current for the base of the transistor Tr1 is cut off, whereby the transistor Tr1 assumes the nonconductive state. Accordingly, the plunger solenoid SOL2 for driving the apparatus on the side for recording incoming messages assumes the inoperative state, and the force with which a pinch roller 71 presses against its capstan 72 is removed.

In addition, the above mentioned output signal from the output terminal ④ of the holding circuit X40 passes through the diode D42 and a resistor R32 and is applied to the base of a transistor Tr5, which thereupon assumes the conductive state. As a consequence, the output current from the power-supply circuit X15 passing through the line *n* as shown in FIG. 5A is supplied through the transistor Tr2 in conductive state and a relay contact point Sf5 to a plunger solenoid SOL3 for driving the rewinding mechanism, whereupon this plunger solenoid SOL3 operates. Accordingly, a roller 79 for rewinding, which is driven by the motor 60, presses against the reel disk on the supply side, and the apparatus 10 is changed over from the state for recording incoming messages to the rewinding state.

Furthermore, the above mentioned output signal from the terminal ④ of the circuit X40 passes also through the diode D42, another diode D35, and a resistor R26 to be applied to the base of a transistor Tr3, which thereupon assumes the conductive state. Consequently, the relay 54 for changing over the apparatus from its state for recording incoming messages to the state for playing back incoming messages operates, and the relay contact points Se1 and Se2 are switched.

During the above mentioned rewinding, the head assembly 70 on the side of recording incoming messages is contacting with light pressure a tape travelling at high speed, whereby a signal reproduced by the head H3 in the head assembly 70 is applied by way of the relay contact point Se1 to the play-back amplifier X9, which is in its operative state bacause of the output of the switch circuit X8. The resulting output signal from the amplifier X9 is applied by way of the line 34, switch S2-5, and relay contact point Se2 to the transformer T2 and the line *u*. This signal is further transmitted through the transformer T2 to the telephone line side, and although the sender of signals for remote control from the remote place cannot understand any information which has any meaning, he can verify that the apparatus is undergoing rewinding operation. Furthermore, the reproduced sound at the time of this rewinding operation from the play-back amplifier X9 is sent as output into a line 1.

During the rewinding operation due to the above described remote control, the output signal from the terminal ④ of the circuit X40 for holding the rewinding state is supplied by way of a diode D33 to an input terminal ⑨ of the control circuits X31 and X33.

Accordingly, as to the control circuit X31, a transistor Tr39 is forwardly biased through a resistor R102 to become conductive, and the base of the transistor Tr16 is grounded, whereby the output generating function of the operating mode control signal of the control circuit X31 becomes ineffective. Moreover, as to the control circuit X33, similarly as in the above described circuit X31, a transistor Tr40 is forwardly biased to become conductive, and the base of the transistor Tr31 is grounded, whereby the output generating function of the operating mode control signal of the control circuit X33 becomes ineffective. Consequently, control of the first digit and the third digit during the rewinding operation becomes impossible.

During this rewinding operation, furthermore, an automatic rewinding stopping circuit X44 receives at the input terminal ⑤ a signal from the output terminal ④ of the circuit X40 and is being held in an operable state. At this time, moreover, the reproduced sound of the rewinding operation is being applied through the line *l* to the terminal ③ of the stopping circuit X44.

When, during the above mentioned rewinding operation, the tape 73 in the cassette for recording incoming messages is rewound to it part where the stop signal is recorded, a stop signal is reproduced by the recording-reproducing head H3 of the head assembly on the incoming message side and is applied by way of the line *l* to the input terminal ③ of the stopping circuit X44. This stop signal is distinguished within the circuit X44 from the reproduced sound of the rewinding operation, amplified, rectified, DC amplified, and led out as a DC output signal through the output terminal ④. This output signal is applied through a diode D31 to the input terminal ⑤ of the circuit X40 for holding the rewinding state thereby to reset the circuit X40 into the inoperative state. Consequently, the plunger solenoid SOL3 for rewinding is rendered inoperative, and the rewinding operation of the tape 73 in the cassette on the side for recording incoming messages stops.

Furthermore, the holding circuit X40 is rendered inoperative, whereby the output signal from the output terminal ④ stops, and a signal is no longer applied to the base of the transistor Tr6. As a consequence, this transistor Tr6 is placed in the nonconductive state, and the transistor Tr1 is again assumes the conductive since the short circuit between the line *f* and ground is broken. The plunger solenoid SOL2 for driving is thereby activated, and the tape 73 in the cassette for the message recording side is clamped between and driven by the pinch roller 71 and the capstan 72.

At the same time, the above mentioned stop signal is applied to the input terminal ③ of a circuit X38 for holding the play-back state, whereupon this holding circuit X38 was controlled into the operative state and thus held. When the holding circuit X38 is thus converted into the operative state, a voltage is produced at the output terminal ④ and applied through a diode D34 and a resistor R26 to the base of a transistor Tr3, which thereby assumes the conductive state. Accordingly, the relay 54 is supplied with the output current from the DC power supply circuit X15 through the same power supply circuit as that for the plunger solenoid SOL3 for rewinding and thereby operates, and the relay contact points Se1 and Se2 are switched.

The voltage produced at the output terminal ④ of the holding circuit X38 is applied by way of diodes D34 and D51 and line *q* to the switching circuit X8. The switching circuit X8 is supplied with a DC current from the power-supply circuit X15 through the line 30, relay contact point Sc1, switch S4-1, relay contact point Sc2 and switch S2-7, and operates in response to the signal from the line *q* to switch the power supply for the amplifier from the recording side to the play-back or reproducing side. As a result, the apparatus is changed over from the rewinding state to the state for playing back recorded incoming messages.

At any position during the rewinding operation of the apparatus as described above, the apparatus can be changed over from the rewinding mode to the play-back mode by the following manipulation and operation. When, during the rewinding operation, the manipulator transmits a second-digit signal, input control signals are applied to the input terminals ④ and ⑤ of the control circuit X32, and outputs are produced at output terminals ⑥ and ⑦ during the applications of the control signals, as described above. Of these, the output signal from the terminal ⑦ is applied by way of a diode D28 to the input terminal ⑤ of the holding circuit X40 for holding the rewinding state, which circuit thereby is rendered inoperative. When the holding circuit X40 is thus rendered inoperative, the plunger solenoid SOL3 becomes inoperative in the same manner as was descirbed above, while the plunger solenoid SOL2 on the incoming messages side. Furthermore, the output signal from the output terminal ⑦ of the circuit X32 is applied to a control circuit X37. From the instant this output signal is cut off, an output signal is generated for a specific time from the output terminal ④ and applied to the input terminal ③ of the circuit X38 for holding the play-back state, which circuit thereby becomes operative. Thereafter, the apparatus is changed over from the rewinding state to the state for playing back recorded incoming messages by the same operation as was described above. At this time, moreover, the other control circuits X31 and X33 recover their functions since the voltage being applied up to that time from the rewinding state holding circuit X40 to all terminals ⑨ is cut off.

When, after the apparatus has been placed in the play-back state, and the tape within the cassette for recording incoming messages is being played back, the owner of the apparatus wishes to add some comments to the tape 73 in the cassette for recording incoming messages, he carries out the following procedure. When the manipulator transmits a first-digit signal for a short time (less than two seconds) during play-back of a recorded incoming message, the control circuit X31 of the apparatus receives this signal and operates to produce an output at its output terminal ⑦ during receiving of this signal. This output signal is supplied to respective input terminals ③ of a control circuit X35 and of a delay circuit X36.

After its input signal has been cut off, the control circuit X35 produces an output for a specific time at its output terminal ④. This output passes through a diode D29 and is applied to input terminal ⑤ of the circuit X38 for holding the play-back state, which circuit becomes inoperative as ceases to produce an output signal at its output terminal ④. Consequently, the current applied to the base of the transistor Tr3 is cut off, and the relay 54 becomes inoperative, the relay contact points Se1 and Se2 being switched to their original states. In addition, the output signal for the line *q* also disappears, and the switch circuit X8 returns to its original state. Since the recording amplifier X12 becomes operative, a message from the caller is recorded on the tape 73 of the cassette for recording incoming messages by the recording-reproducing head H3 within the head assembly 70 on the side for incoming messages.

When the caller replaces the telephone handset on its cradle with the apparatus set in the above described recording state, the incoming signal from the telephone circuit to the recording amplifier X12 disappears. Consequently, the output signal from the amplifier X12 passing through the line 39 for the VAC X10 is cut off. Accordingly, an output signal from the VAC X10 for the control circuit X7 by way of the diode D15 is similarly cut off approximately 10 seconds after the incoming signal is cut off. Therefore, the control circuit X7 becomes inoperative, and the apparatus is changed over from the recording state to the standby or ready state.

The case wherein the apparatus continuously (during more two seconds) receives a first-digit signal will now be considered. This signal is supplied to the delay circuit X36, which becomes conductive a specific time (approximately 2 seconds) after being supplied with its input, and an output signal appears from its output terminal ④. This output passes through diodes D24 and D29 and enters the play-back state holding circuit X38, thereby resetting this holding circuit into its inoperative state. Consequently, the apparatus is changed over from the play-back state to the incoming message recording state as described above.

Furthermore, the output from the terminal ④ of the delay circuit X36 passes through a line *m* and is supplied by way of a diode D16 to a stop-signal generator X14. As a consequence, the signal generator X14 operates to generate a stop signal which is recorded on the tape 73 by the head H3 of the head assembly 70. Thus, the caller, after hearing the recorded incoming signals, continuously transmits the first-digit signal, whereby a stop signal can be newly recorded, and erroneous erasing of important recorded incoming messages can be avoided.

Figure 5B:
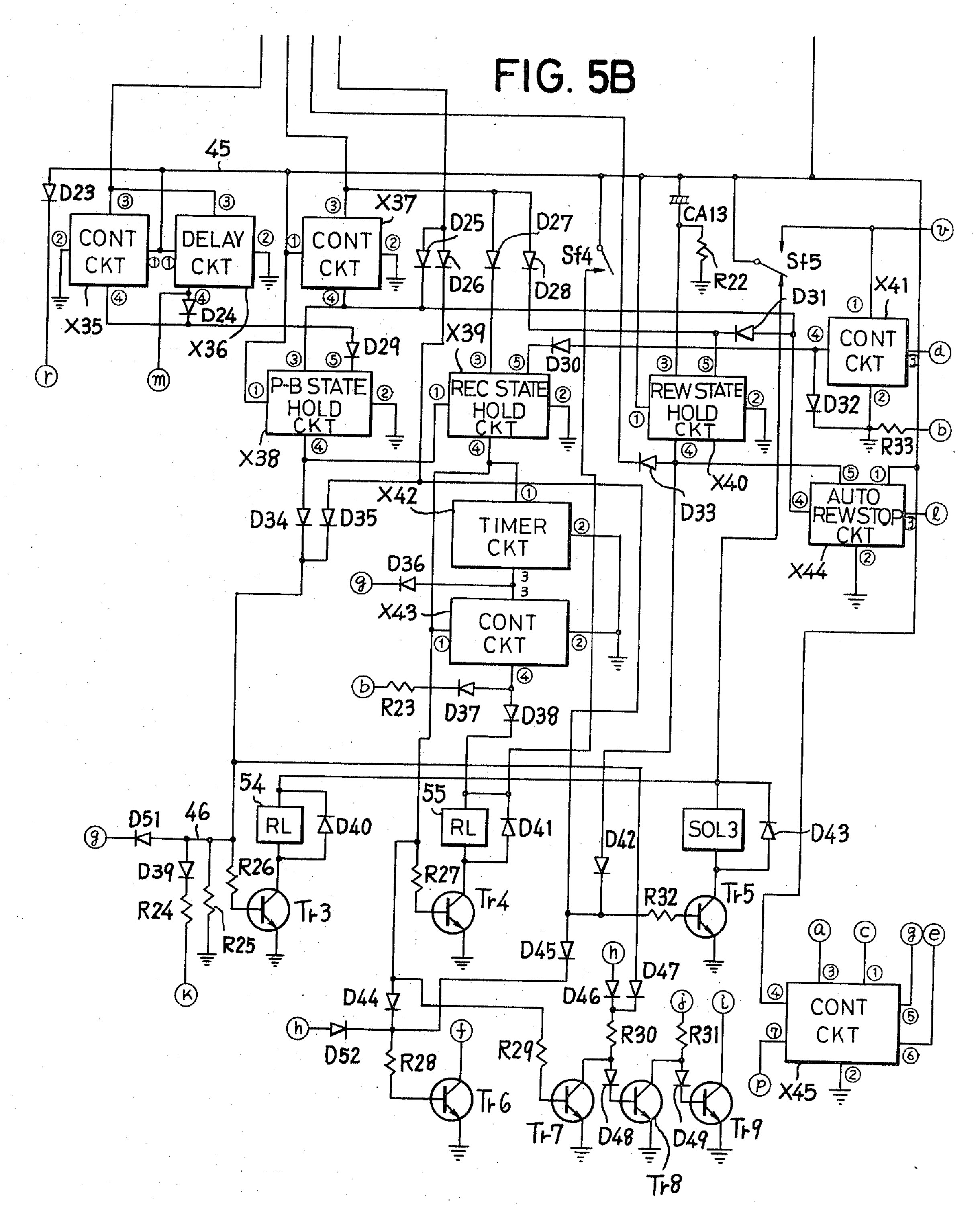
Figure 7:
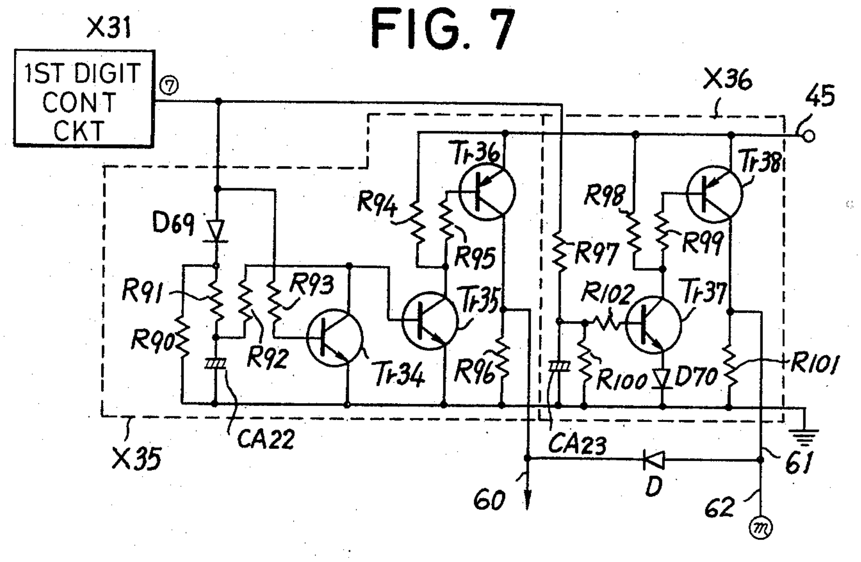
FIG. 7 is a circuit diagram of one embodiment of a control circuit and delay circuit for operating in correspondence with a first-digit control signal.

A specific embodiment of the aforementioned control circuit X35 and delay circuit X36 for controlling the succeeding play-back state holding circuit X38 to set it in operative or inoperative state in accordance with the receiving period of the input signal will now be described with reference to FIG. 7, in which parts which are the same as those in FIG. 5B are designated by like numerals or characters. Detailed description of such parts already described will not be repeated.

First, the operation when the output period of the control signal from the control circuit X31 of the first digit is a short period (less than 2 seconds) will now be described. The control signal from the output terminal ⑦ of the control circuit X31 is supplied to the control circuit X35 and the delay circuit X36. The signal applied to the control circuit X35 charges a capacitor CA22 by way of a diode D69 and a resistor R91. A transistor Tr34 is forwardly biased through a resistor R93 and is thereby held conductive state. In the case where the output signal from the control circuit X31 terminates before a specific duration period, the transistor Tr34 is rendered nonconductive. Moreover, on one hand, the charge in the capacitor CA22 is partly discharged through a resistor R92 and applied to the base of a transistor Tr35, whereby the transistor Tr35 becomes conductive. When the transistor Tr35 is turned on a transistor Tr36 is forwardly biased by way of a resistor R95 and the transistor Tr35, and the transistor Tr36 is thereby rendered conductive.

When the transistor Tr36 thus becomes conductive, the remote controlling power being sent to the line 45 is led through the transistor Tr36 to a line 60 and further supplied through the diode D29 to the play-back state holding circuit X38 as described before. Therefore, the holding circuit X38 is rendered inoperative, and the apparatus is placed in the recording mode.

The period during which the output is appearing in the line 60 is equal to the period when the transistor Tr34 is held conductive, which is determined by the time constant of the discharging circuit comprising the capacitor Ca22, resistors R90, R91, and R92, and the transistor Tr34. Moreover, the signal which is sent from the control circuit X31 to the delay circuit X36 is supplied through a resistor R97 to a capacitor CA23. This capacitor CA 23, however, will not be charged to a level sufficient to render a transistor Tr37 to conductive, whereby the delay circuit X36 will be held in inoperative condition.

Next, the operation when the output period of the control signal from the control circuit of the first digit is a long period (more than two seconds) will now be described. The control signal from the control circuit X31 is also supplied to the control circuit X35 and the delay circuit X36, and the control circuit X35 operates as described before. The signal supplied to the delay circuit X36 charges the capacitor CA23 through the resistor R97, and the terminal voltage of the capacitor CA23 rises according to the time constant determined by the charging circuit comprising the capacitor CA23 and the resistor R97 over the specific value, whereby the transistor Tr37 is rendered conductive. Accordingly, a transistor Tr38 is forwardly biased by way of a resistor R99 and the transistor Tr37 and becomes conductive.

Consequently, after the elapse of a specific time (e.g., 2 seconds) determined by the above time constant from the instant of arrival of the control signal at the delay circuit X36, the remote controlling power which has been led to the line is conducted to a line 61 by way of the transistor Tr38 and further shunted to a line 62 and to the line 60 through a diode D24. The control power led to the line 60 through the diode D24 is supplied to the above circuit X38 for holding the play-back state, whereby the circuit X38 is rendered inoperative, and the apparatus thus assumes the recording mode.

Figure 4B:
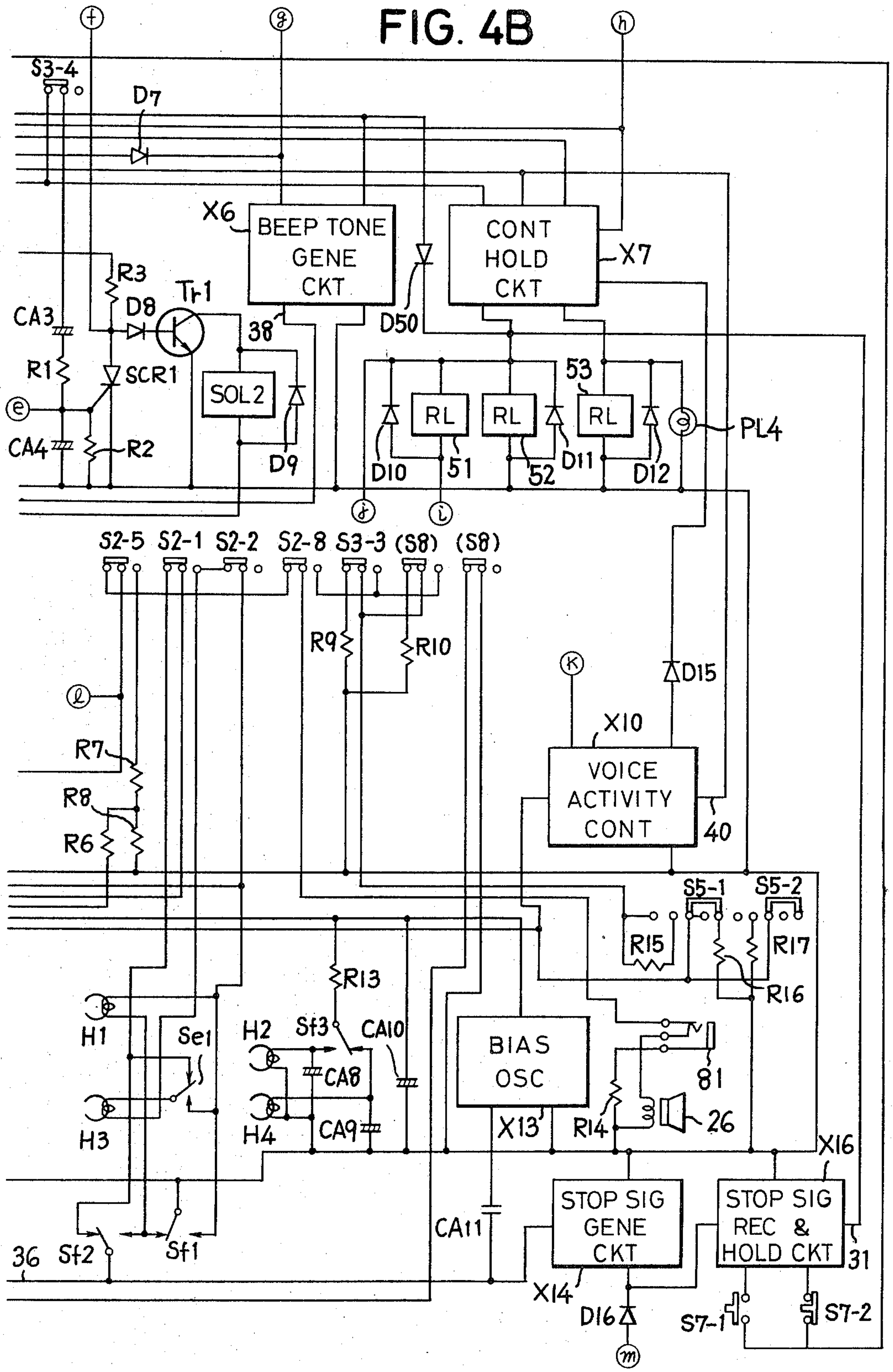

On one hand, the control power led to the line 62 is supplied through the line *m* to the stop signal oscillator X14 shown in FIG. 4B. The oscillator X14 thus starts operating, and the oscillating output therefrom is recorded as a stop signal on the magnetic tape 72 by means of the head H3 of the head assembly 70. Moreover, when the control signal from the control circuit X31 is cut off, the operation of recording the stop signal stops, but the apparatus is still further kept in recording state.

When the apparatus receives a second-digit signal transmitted by the caller during the playing back of a recorded incoming message, the control circuit X32 operates, and an output is produced at the output terminal ⑦. At this time, the play-back state holding circuit 38 is already held in operative state, and a circuit X39 for holding the state of recording a notice of the owner's absense is being supplied at its input terminal ① with an output signal from the above mentioned holding circuit X38. The output from the output terminal ⑦ of the control circuit X32 is applied through a diode D27 to the input terminal ③ of the recording state holding circuit X39, which is thereby controlled, and an output appears at its output terminal ④. This output from the output terminal ④ is applied by way of a timer circuit X42 and a resistor R27 to the base of a transistor Tr4 and by way of a diode D44 and the resistor R28 to the base of the transistor Tr6. When the transistor Tr6 is thus supplied with current at its base, it becomes conductive, and the transistor Tr1 becomes nonconductive, its base being short circuited with respect to the line *f*. The plunger solenoid SOL2 on the incoming message side is thereby rendered inoperative, whereby the pinch roller 71 stops pressing against the capstan 72, and the driving of the tape 73 in the cassette on the incoming message recording side is stopped.

The timer circuit X42, upon being supplied with the above mentioned output from the output terminal ④. produces an output at its output terminal ③ for a predetermined time (approximately from 2 to 3 seconds). This output is applied by way of a diode D36 and a line *g* to the beep tone generating circuit X6 and is simultaneously applied to the input terminal ③ of a control circuit X43. Consequently, the beep tone generating circuit X6 operates, and a beep tone is generated through the line 38 and is transmitted by way of the transformer T2 to the telephone line side.

After its input signal has been cut off, the control circuit X43 produces an output at its output terminal ④ for a predetermined time. This output passes through a diode D38 and is supplied to the relay 55 for recording anew the notice of the owner's absence, which is being grounded by the conductive state of the transistor Tr4. Consequently, relay contact points Sf1 through Sf5 are switched, and the relay 55 is self-held by the closing particularly of the relay contact point Sf4. Furthermore, the output from the output terminal ④ of the control circuit X43 is applied through a diode D37, a resistor R23, and a line *b* to the relay holding circuit X4, and the relay 50 operates. Consequently, the relay contact points Sa1 and Sa2 are switched, and the plunger solenoid SOL1 on the answering side and the motor 60 become operative, and the apparatus on the answering side is activated.

As another result of the operation of the relay 55, the relay contact point Sf5 is switched, whereupon the relay 54 no longer receives power and assumes its inoperative state. At this time, furthermore, as a result of the switching of the relay contact points Sf1 through Sf3, a recording-reproducing head H1 and an erasing head H2 incorporated in a head assembly 78 on the answering side become operative. After hearing the beep tone indicating the start of recording of a new message, the caller can record a new message on an endless tape 74 on the answering side.

As a result of the above described operation, the endless tape 74 completes one cycle of travel, and the sensing tape 22 short circuits a sensor 77, whereby the sensor operation circuit X5 operates, and an output produced in the line 37 is applied by way of a diode to the beep tone generating circuit X6. Consequently, the beep-tone output signal from the circuit X6 is supplied through the line 38 to the transformer T2 and is transmitted further through the telephone line to the caller. The sensor operation circuit X5 produces an output into the line 35 simultaneously with the cutting off of the output signal for the line 37. The output produced in the line 35 is applied to the circuit X4 for relay control holding, which is rendered inoperative, whereby the relay 50 becomes inoperative. Consequently, the plunger solenoid SOL1 on the answering side becomes inoperative, and the apparatus on the answering side is stopped.

In addition, the output produced in the line 35 is applied through a line *d* to a control circuit X41. This control circuit X41 is of the same type as the control circuit X34 and, after the input applied to the input terminal ③ stops while power is being supplied through the relay contact point Sf5 to the input terminal ①, produces an output at the output terminal ④. This output is applied by way of a diode D30 to the input terminal ⑤ of the circuit X39 for holding the state of recording of a notice of absence of the owner, which circuit X39 is rendered inoperative. Furthermore, the output signal from the control circuit X41 is applied through a diode D32, a resistor R33, and the line *b* to the relay control holding circuit X4, which thereupon operates. Accordingly, the relay 50 again operates, and the answering side apparatus operates.

When the above mentioned holding circuit X39 becomes inoperative, the transistor Tr4 is turned off, and the relay 55 for recording anew the notification of the owner's absence is also turned off. When the relay 55 is thus turned off, a DC current from the DC power supply X15 is supplied by way of the relay contact point Sf5, whereby the relay 54 again assumes the operative state. As a result, the recording-reproducing head H1 in the head assembly 78 and the amplifier are changed over to the play-back side, and playing back of the recorded new message is carried out.

When, upon completion of an automatic check of the recorded content as described above, the sensor 77 is again short circuited by the sensing tape 22 of the endless tape 74, the sensor operation circuit X5 operates. Thereupon, similarly as described above, the beep tone generating circuit X6 first operates to transmit a beep tone to the caller's side. Furthermore, the relay control holding circuit X4 is rendered inoperative, and relay 50 is turned off, whereupon the plunger solenoid SOL1 of the answering side becomes inoperative. Accordingly, the endless tape 74 on the answering side is released from its pressed and driven state between the capstan 76 and pinch roller 75 and stops.

As another result of the relay 50 being turned off, an output from a line *h* disappears, whereby the transistor Tr6 becomes nonconductive and the transistor Tr1 again becomes conductive. The plunger solenoid SOL2 of the incoming message side is activated, and the pinch roller 71 is pressed against the capstan 72, and the apparatus on the incoming message recording side operates.

Since its power supply is being cut off by the relay contact point Sf5, the control circuit X41 is held in its inoperative state even when output signal passing from the sensor operation circuit X5 through the line *d* is applied to the input terminal ③ of the circuit X41. Consequently, the holding circuit X4 is also held in inoperative state. Therefore, at time when the automatic check of the recorded new message is completed, the play-back state holding circuit X38 is in operative state as described hereinbefore. If the apparatus receives a second-digit signal, it will repeat its operation of recording a new message.

In the case where, during recording of an incoming message by the above described control manipulation, the caller transmits a second-digit signal, the apparatus operates in the following manner. When the apparatus receives the second-digit signal, outputs are produced at the selectors X27 and X28 and are supplied to the input terminals ④ and ⑤ of the control circuit X32 and, at the same time, as transmitted by way of diodes D19 and D20 to lines *t* and *s*. The control circuit X32 is activated by arrival of the above mentioned signal and produces and output through its output terminal ⑦ thereby to activate the control circuit X37 and the play-back state holding circuit X38 similarly as described above. The apparatus thereby assumes its state of playing back recorded incoming messages.

An output signal passing through a line *n* from the power supply circuit X15 is transmitted through the transistor Tr2, a line 45, and a diode D23 to enter a line *r*. The switch circuit X11 is supplied simultaneously with signals through the input lines *r*, *s*, and *t* and operates to cut off the power supply for the recording amplifier X12. The reason for this is that, when a control signal is received during recording operation and is recorded, as it is, on the tape, this signal will be reproduced in the playing back of a recorded incoming message to cause erroneous operation, and this must be prevented. That is, the reception of any control signal from among the control signals of three digits during recording immediately causes the recording amplifier to be turned on.

In the case where the caller transmits a third-digit signal during recording of an incoming message, the apparatus operates as follows. When the apparatus receives this signal through the telephone line, the power supply of the recording amplifier X12 is cut off by the switching circuit X11 and is in the inoperative state while this signal is being received. On one hand, the control circuit X33 operates, and the output from the output terminal ⑦ is applied by way of a diode D25 to the input terminal three of the circuit X38 for holding the play-back state. Consequently, the holding circuit X38 operates, and an output from its output terminal ④ causes the transistor Tr3 to be held in its conductive state. Accordingly, the relay 54 is activated, and the amplifiers and signal system of the apparatus are placed in the play-back or reproducing state.

In addition, the output of the control circuit X33 is applied through a diode D26, the diode D45, and a resistor R28 to the base of the transistor Tr6, which thereby becomes conductive. As a consequence, the base of the transistor Tr1 and ground are short circuited, whereby this transistor becomes nonconductive, and the plunger solenoid P2 on the incoming message side becomes inoperative. The pinch roller 71 is thereby no longer pressed against the capstan 72. At the same time, the output of the control circuit X33 is applied by way of the diode 26 and the resistor R32 to the base of the transistor Tr5, which thereupon becomes conductive. Consequently, the plunger solenoid SOL3 for rewinding operate only while the third-digit signal is being received, whereby the roller 79 for rewinding driven by the motor 60 presses against the reel disk on the supply side, and rewinding of the cassette tape 73 on the incoming message side takes place.

When reception of the third-digit signal stops, the output from the control circuit X33 disappears, the current applied to the bases of the transistors Tr5 and Tr6 is cut off, whereby these transistors become nonconductive, but the transistor Tr3 is held in its conductive state since the holding circuit X38 is in operative state. When the transistor Tr6 becomes nonconductive, the plunger solenoid SOL3 for rewinding becomes inoperative, and the rewinding roller 79 stops pressing against the reel disk on the supplying side, whereupon the rewinding operation stops. Furthermore, as a result of the changing over of the transistor Tr5 to its nonconductive state, the transistor Tr1 becomes conductive, and the plunger solenoid SOL2 on the incoming message side becomes operative, whereby the corresponding cassette tape 73 is clamped between the pinch roller 71 and the capstan 72 and is again driven thereby. At this time, the transistor Tr3 is held in the conductive state, and the relay 54 maintained in operative state, whereby the apparatus is placed in the state for reproducing recorded incoming messages.

In all operations of the apparatus other than the recording of incoming messages, there is some DC output in a line 46 and is being supplied through a diode D39, a resistor R24, and a line *k* to the VAC X10. Consequently, the output of the VAC X10 at this time is being supplied by way of the diode D15 to the control holding circuit X7, which is thereby being held in its operative state.

In the case where, when the apparatus is operating in response to a call from an ordinary caller and is carrying out recording of the caller's message, the tape for this recording reaches its extreme end position, the following operation is carried out. When the tape thus reaches its extreme end position, an end switch S6

(switch 80 in FIG. 1C) is closed by tape tension, and a DC voltage supplied from the power-supply circuit X15 is applied through the line *a* to a tape end control circuit X45. This control circuit X45 is supplied with a DC current at its input terminal ④ and is in operative state and, when an input is applied to its input terminal ③, immediately produces a DC signal through its output terminal ⑦. This signal passes through a line *p* and is applied to the switching circuit X8, and the power supply for the reproducing amplifier X9 is cut off. The terminal ③ of the control circuit X45 is connected directly to the switch S6, and while this switch S6 is closed, an output is produced at the output terminal ⑤. This output is applied through the line *g* to the beep-tone generating circuit X6, which thereby operates to generate a beep tone. This beep tone is transmitted by way of the line 38 and the transformer T2 to the caller.

After the elapse of a predetermined time (approximately 1 second) from this transmission of the beep tone, a DC signal is emitted from the output terminal ⑥ of the control circuit X45 and is applied by way of a line *e* to a silicon-control rectifier SCR1. Consequently, the rectifier SCR1 is turned on, and the base and emitter of the transistor Tr1 are short circuited, whereby this transistor becomes nonconductive. Accordingly, the plunger solenoid SOL2 for driving the apparatus on the incoming message recording side is rendered inoperative, and the pinch roller 71 is no longer pressed against the capstan 72. The tension in the magnetic tape 73 thus released from the clamping and driving action of the pinch roller 71 and the capstan 72 weakens, and the switch S6 is again opened. The output from the terminal ⑦ of the above mentioned control circuit X45 is sustained until there is a succeeding call signal and an input is applied to the input terminal ④.

Accordingly, at the time of the succeeding call signal, since the play-back amplifier X9 is already being held in the inoperative state, the endless tape 74 on the answering side is driven, similarly as described hereinbefore, and the recorded statement is reproduced by the recording-reproducing head H1 of the head assembly 78 for the answering side, but sending of the answering statement to the caller is not carried out. Therefore, while the cassette tape on the side for recording incoming messages is being wound up to its extreme end, a general caller is not informed of the answering statement and merely hears a beep tone, and recording of an incoming message through error is prevented. In the above described situation, the owner of the apparatus can verify the fact that the tape for recording incoming messages has been wound to its extreme end and, moreover, can freely carry out rewinding control manipulations, whereby there is no problem.

The remote-control system and apparatus of an automatic telephone answering and recording apparatus according to the present invention have advantageous features as described below.

1. The first control circuit of the automatic telephone answering and recording apparatus is adapted to produce as output control signals for remote operation when control signals corresponding to numerals of predetermined digits are successively applied in correct sequence with intervals within predetermined times and thereafter to produce as output mode changing signals for changing between the operational modes of "record," "playback," "rewind," and the like in response to and in accordance with the signals of the different digits. There operations can be accomplished by a single circuit.

2. The second control circuit is adapted to place the apparatus in the state for recording messages or comments in the case where the output time of the mode changing signal produced as output from the above mentioned first control circuit is shorter than the predetermined time and to place the apparatus in the state for recording the signal for stopping in the case where the output time is longer than the predetermined time. Thus, this single control circuit is capable of controlling two operations in accordance with the length of a single control signal.

Further, this invention is not limited to these embodiments but various variations and modifications may be made without departing from the scope and spirit of the invention.

What we claim is:

1. A remote control system for an automatic telephone answering and recording apparatus which includes first means for recording on and reproducing from a first cassette tape an answering statement, and second means for recording on and reproducing from a second cassette tape incoming messages by callers; said system comprising:

a. answering means responsive to an incoming call arriving through a telephone line from a caller for automatically operating said first means to reproduce the answering statement previously recorded on said first cassette tape and for sending the statement through the telephone line toward the caller;

b. incoming message recording means responsive to completion of the reproduction of the answering statement by said first means for operating said second means to record on the second cassette tape incoming messages sent by the caller through the telephone line;

c. generating means for generating a plurality of kinds of pair tones comprising low tones and high tones;

d. detecting means responsive to a set of pair tones selected from the kinds of pair tones which are generated in sequence by said generating means and sent through the telephone line for producing a first control voltage only when the set of pair tones coincide with a predetermined set of pair tones;

e. first control means responsive to the first control voltage for driving said second means to rewind the second cassette tape;

f. second control means responsive to stopping of the rewinding of the second cassette tape for driving said second means to reproduce the incoming messages; after said detecting means produced the first control voltage, said detecting means producing a second control voltage in response to first digital component pair tones of the set of pair tones which first digital component pair tones are generated by said generating means with a duration shorter than a predetermined time duration and sent through the telephone line, a third control voltage in response to first digital component pair tones of the set of pair tones which first digital component pair tones are generated by said generating means with a duration longer than the predetermined time duration and sent through the telephone line, a fourth control voltage in response to second digital component pair tones of the set of pair tones which second digital component pair tones are generated by said generating means and sent through the telephone line, and a fifth control voltage in response to third component pair tones of the set of pair tones which third digital component pair tones are generated by said generating means and sent through the telephone line;

g. means responsive to the second control voltage for converting said second means to a recording mode;

h. means responsive to the third control voltage for recording a stop signal on the second cassette tape;

e. means responsive to the fourth control voltage for converting said second means to a play-back mode; and j. means responsive to the fifth control voltage for converting said second means to a rewinding mode.

2. A remote control system as defined in claim 1 in which said generating means comprises a touch-tone telephone operated by push-button pushing manipulation to generate said pair tones corresponding to numerals from 0 to 9.

3. A remote control system as defined in claim 1 in which said generating means comprises a portable generator for generating pair tones equivalent to pair tones generated by a touch-tone telephone operated by push-button pushing manipulation to generate pair tones of tones corresponding to numerals from 0 to 9.

* * * * *

UNITED STATES PATENT OFFICE
CERTIFICATE OF CORRECTION

Patent No. 3,872,254 Dated March 18, 1975

Inventor(s) MASAMICHI MURATA and YUJI URAYAMA

It is certified that error appears in the above-identified patent and that said Letters Patent are hereby corrected as shown below:

First page of patent, col. 1, last line, "169/6E" should read --179/6E--. Column 1, line 24, "a" should read --at--; line 34, "way" should read --away-- and "this" should read --his--. Column 2, line 6, "make" should read --makes--; line 18, "diffiiculite" should read --difficulties--. Column 3, line 5, "an" should read --can--; line 31, "callling" should read --calling--; line 64, "tarts" should read --starts--; line 67, "iis" should read --its--. Column 4, line 52, "iis" should read -- is --. Column 6, line 10, "msy" should read --may--; lines 26 and 27, "therafter" should read --there-after--; line 36, "beings" should read --begins--. Column 7, line 40, "referencne" should read --reference--. Column 8, line 7, "singal" should read --signal--. Column 9, line 31, after "relay" insert --contact--; line 48, "pass" should read --passes--. Column 10, line 15, after "SOL1" insert --for--; line 21, "resuling" should read --resulting--; line 41, after "Sel" insert --of relay--; line 67, "handest" should read --handset--. Column 11, line 22, after "as" insert --a--; line 50, "consituting" should read --constituting--; line 52, "manipluated" should read --manipulated--. Column 12, line 4, after "and" insert --a--; line 9, "correpsonding" should read --corresponding--; line 28, omit "a"; line 36, after "1,331 Hz" insert --in--; line 39, "selector" should read --selectors--. Column 13, line 15, "conicides" should read --coincides--. Column 17, line 14 "bacause" should read --because--. Column 26, line 3, "there" should read --these--. Column 27, line 14, "e" should read --i--.

Signed and Sealed this

*seventh* Day of *October 1975*

[SEAL]

*Attest:*

RUTH C. MASON
*Attesting Officer*

C. MARSHALL DANN
*Commissioner of Patents and Trademarks*